US012567383B2

(12) United States Patent
Wang et al.

(10) Patent No.: US 12,567,383 B2
(45) Date of Patent: Mar. 3, 2026

(54) DISPLAY MODULE, DISPLAY DEVICE AND DISPLAY SYSTEM

(71) Applicants: Beijing BOE Display Technology Co., Ltd., Beijing (CN); BOE TECHNOLOGY GROUP CO., LTD., Beijing (CN)

(72) Inventors: Jianting Wang, Beijing (CN); Xue Tian, Beijing (CN); Yulong Fu, Beijing (CN); Tianyang Han, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/696,274

(22) PCT Filed: Sep. 27, 2022

(86) PCT No.: PCT/CN2022/121757

§ 371 (c)(1),
(2) Date: Mar. 27, 2024

(87) PCT Pub. No.: WO2024/065184

PCT Pub. Date: Apr. 4, 2024

(65) Prior Publication Data

US 2025/0046260 A1 Feb. 6, 2025

(51) Int. Cl.
*G09G 3/34* (2006.01)

(52) U.S. Cl.
CPC ....... *G09G 3/3406* (2013.01); *G09G 2330/04* (2013.01); *G09G 2360/145* (2013.01)

(58) Field of Classification Search
CPC ............ G09G 3/3406; G09G 2330/04; G09G 2360/145; G02F 1/133
See application file for complete search history.

(56) References Cited

U.S. PATENT DOCUMENTS

2001/0030635 A1 10/2001 Kodate
2007/0159742 A1 7/2007 Iwabuchi
2011/0037757 A1* 2/2011 Song ...................... G09G 5/006 345/213
2014/0168567 A1* 6/2014 Kikuchi ................ H05B 45/14 349/61
2015/0026506 A1 1/2015 Lee
(Continued)

FOREIGN PATENT DOCUMENTS

CN 1210327 A 3/1999
CN 1721864 A 1/2006
(Continued)

*Primary Examiner* — Antonio Xavier
(74) *Attorney, Agent, or Firm* — HOUTTEMAN LAW LLC

(57) ABSTRACT

The present disclosure provides a display module, including: a detection module configured to detect operation characteristic information of each of at least one target part in the display module during operation of the target part, and determine operation state information of the target part according to the operation characteristic information of the target part; and a transmission module configured to transmit the operation state information. The present disclosure further provides a display device and a display system.

9 Claims, 24 Drawing Sheets

(56) References Cited

U.S. PATENT DOCUMENTS

| | | | | |
|---|---|---|---|---|
| 2015/0069927 | A1* | 3/2015 | Li | G09G 3/3406 315/224 |
| 2016/0240130 | A1* | 8/2016 | Nishimura | G09G 3/006 |

FOREIGN PATENT DOCUMENTS

| | | | |
|---|---|---|---|
| CN | 101124705 | A | 2/2008 |
| CN | 101782456 | A | 7/2010 |
| CN | 203799227 | U | 8/2014 |
| CN | 205584392 | U | 9/2016 |
| CN | 106507013 | A | 3/2017 |
| CN | 206058821 | U | 3/2017 |
| CN | 107808645 | A | 3/2018 |
| CN | 108682367 | A | 10/2018 |
| CN | 109891313 | A | 6/2019 |
| CN | 110998704 | A | 4/2020 |
| CN | 111951723 | A | 11/2020 |
| CN | 113129789 | A | 7/2021 |
| CN | 113948023 | A | 1/2022 |
| CN | 114708822 | A | 7/2022 |

* cited by examiner

DISPLAY MODULE, DISPLAY DEVICE AND DISPLAY SYSTEM

TECHNICAL FIELD

The present disclosure relates to the field of display technology, and in particular to a display module, a display device, and a display system.

BACKGROUND

With the rapid development of internet technology, the application of "internet+" is more and more extensive and rapidly rises in various industries, and various intelligent products capable of being accessed to the internet come out endlessly. In this context, intelligent display products have emerged. The existing intelligent display product not only has a display function, but also serves as an important data input port of the internet of things and has the functions of data acquisition, information release, interaction and the like.

However, the existing intelligent display product has relatively low intelligent degree and does not have a fault self-diagnosis function, operation and maintenance of the intelligent display product can be performed through only manual on-site inspection. With the increasing number and scattered locations of the intelligent display products, it brings great difficulty to the operation and maintenance of the products.

SUMMARY

The present disclosure aims to solve at least one technical problem in the prior art and provides a display module, a display device, and a display system.

In a first aspect, embodiments of the present disclosure provide a display module, including a monitoring system, where the monitoring system includes:

a detection module, which is configured to detect operation characteristic information of each of at least one target part in the display module during operation of the target part, and determine operation state information of the target part according to the operation characteristic information of the target part; and a transmission module, which is configured to transmit the operation state information.

In some embodiments, the display module further includes a power component and a display control system component;

the at least one target part includes the power component, and the operation characteristic information of the power component during operation of the power component includes a control system voltage signal in each first power supply channel for supplying power by the power component to the display control system component; and the detection module includes:

a first detection unit, which is connected to the first power supply channel and configured to output, in response to control of a first detection signal and according to a condition of the control system voltage signal loaded in the first power supply channel, first operation state information for representing that supplying power by the power component to the display control system component is normal, or second operation state information for representing that the supplying power by the power component to the display control system component is abnormal.

In some embodiments, a number of the first power supply channel for supplying power by the power component to the display control system component is one;

the first detection unit includes a first voltage detection circuit; and an input terminal of the first voltage detection circuit is electrically connected to the first power supply channel, and the first voltage detection circuit is configured to output first operation state information when the first power supply channel is loaded with the control system voltage signal, and output second operation state information when the first power supply channel is not loaded with the control system voltage signal.

In some embodiments, a number of the first power supply channel for supplying power by the power component to the display control system component is greater than or equal to two;

the first detection unit includes a logic processing circuit and at least two first voltage detection circuits in one-to-one correspondence with the first power supply channels;

an input terminal of each of the first voltage detection circuits is electrically connected to a corresponding one of the first power supply channels, and an output terminal of the first voltage detection circuit is electrically connected to an input terminal of the logic processing circuit;

the first voltage detection circuit is configured to output a first level signal when the corresponding first power supply channel is loaded with the control system voltage signal, and output a second level signal when the corresponding first power supply channel is not loaded with the control system voltage signal;

the logic processing circuit is configured to output first operation state information when each of the first voltage detection circuits electrically connected to the logic processing circuit outputs the first level signal, and output second operation state information when at least one of the first voltage detection circuits electrically connected to the logic processing circuit outputs the second level signal; and one of the first level signal and the second level signal is a high level signal, and the other of the first level signal and the second level signal is a low level signal.

In some embodiments, the first power supply channels for supplying power by the power component to the display control system component include a power supply channel for providing the display control system component with operating voltage required for the display control system component, and a power supply channel for providing the display control system component with the operating voltage required for a display panel.

In some embodiments, the first voltage detection circuit includes a first resistor, a second resistor, a third resistor and a first transistor;

a first terminal of the first resistor is electrically connected to the input terminal of the first voltage detection circuit, and a second terminal of the first resistor is electrically connected to a first terminal of the second resistor and a gate of the first transistor;

the first terminal of the second resistor is electrically connected to the gate of the first transistor, and a second terminal of the second resistor is electrically connected to a low level supply terminal;

a first electrode of the first transistor is electrically connected to an output terminal of the first voltage detection circuit, and a second electrode of the first transistor is electrically connected to the low level supply terminal; and a first terminal of the third resistor is electrically connected to a first high level supply terminal, and a second terminal of the third resistor is electrically connected to the output terminal of the first voltage detection circuit and the first electrode of the first transistor.

In some embodiments, the display control system component includes a standby power supply module, and the first high level supply terminal is an output terminal of the standby power supply module.

In some embodiments, the first power supply channel is provided with a safety circuit, a first terminal of the safety circuit is electrically connected to the power component, and a second terminal of the safety circuit is electrically connected to the display control system component; and the first detection unit is electrically connected to the second terminal of the safety circuit.

In some embodiments, the display module further includes a display control system component and a timing control component;

the at least one target part includes the display control system component, and the operation characteristic information of the display control system component during operation of the display control system component includes a timing controller voltage signal in a second power supply channel for supplying power by the display control system component to the timing control component; and the detection module includes;

a second detection unit, which is connected to the second power supply channel and configured to output, in response to control of a second detection signal and according to a condition of the timing controller voltage signal loaded in the second power supply channel, third operation state information for representing that supplying power by the display control system component to the timing control component is normal, or fourth operation state information for representing that the supplying power by the display control system component to the timing control component is abnormal.

In some embodiments, the second detection unit includes:

a second voltage detection circuit, where an input terminal of the second voltage detection circuit is electrically connected to the second power supply channel, and the second voltage detection circuit is configured to output the third operation state information when the second power supply channel is loaded with the timing controller voltage signal, and output the fourth operation state information when the second power supply channel is not loaded with the timing controller voltage signal;

the second voltage detection circuit includes an eleventh resistor, a twelfth resistor, a thirteenth resistor, and an eleventh transistor;

a first terminal of the eleventh resistor is electrically connected to the input terminal of the second voltage detection circuit, and a second terminal of the eleventh resistor is electrically connected to a first terminal of the twelfth resistor and a gate of the eleventh transistor;

the first terminal of the twelfth resistor is electrically connected to the gate of the eleventh transistor, and a second terminal of the twelfth resistor is electrically connected to a low level supply terminal;

a first electrode of the eleventh transistor is electrically connected to an output terminal of the second voltage detection circuit, and a second electrode of the eleventh transistor is electrically connected to the low level supply terminal; and a first terminal of the thirteenth resistor is electrically connected to a first high level supply terminal, and a second terminal of the thirteenth resistor is electrically connected to the output terminal of the second voltage detection circuit and the first electrode of the eleventh transistor.

In some embodiments, the second power supply channel is provided with a power supply transistor, a first electrode of the power supply transistor is electrically connected to the display control system component, and a second electrode of the power supply transistor is electrically connected to the timing control component; and the second detection unit is electrically connected to the second electrode of the power supply transistor.

In some embodiments, the display module further includes a backlight driving component;

the at least one target part includes the backlight driving component, a power supply output terminal of the backlight driving component is electrically connected to a first terminal of the backlight source, and the backlight driving component is provided with an I2C data reading interface;

the operation characteristic information of the backlight driving component during operation of the backlight driving component includes a backlight source voltage signal at a power supply output terminal for supplying power by the backlight driving component to the backlight source; and the detection module includes:

a third detection unit, which is connected to the I2C data reading interface for the backlight driving component and configured to output, in response to control of a third detection signal and according to a voltage value of the backlight source voltage signal at the power supply output terminal, which is read by the I2C data reading interface for the backlight driving component, fifth operation state information for representing that supplying power by the backlight driving component to the backlight source is normal, or sixth operation state information for representing that the supplying power by the backlight driving component to the backlight source is abnormal.

In some embodiments, the display module further includes a backlight driving component and a backlight source;

the at least one target part includes the backlight driving component, and a power supply output terminal of the backlight driving component is electrically connected to a first terminal of the backlight source;

the operation characteristic information of the backlight driving component during operation of the backlight driving component includes a backlight source voltage signal at the power supply output terminal for supplying power by the backlight driving component to the backlight source; and the detection module includes:

a third detection unit, which is electrically connected to the power supply output terminal and configured to output, in response to control of a third detection signal and according to a condition of the backlight source voltage signal loaded at the power supply output terminal, fifth operation state information for representing that supplying power by the backlight driving component to the backlight source is normal, or sixth operation state information for representing that the supplying power by the backlight driving component to the backlight source is abnormal.

In some embodiments, the third detection unit includes a third voltage detection circuit;

an input terminal of the third voltage detection circuit is electrically connected to the power supply output terminal, and the third voltage detection circuit is configured to output the fifth operation state information when the power supply output terminal is loaded with the backlight source voltage signal, and output the sixth operation state information when the power supply output terminal is not loaded with the backlight source voltage signal;

the third voltage detection circuit includes a twenty-first resistor, a twenty-second resistor, a twenty-third resistor, and a twenty-first transistor;

a first terminal of the twenty-first resistor is electrically connected to the input terminal of the third voltage detection circuit, and a second terminal of the twenty-first resistor is electrically connected to a first terminal of the twenty-second resistor and a gate of the twenty-first transistor;

the first terminal of the twenty-second resistor is electrically connected to the gate of the twenty-first transistor, and a second terminal of the twenty-second resistor is electrically connected to a low level supply terminal;

a first electrode of the twenty-first transistor is electrically connected to an output terminal of the third voltage detection circuit, and a second electrode of the twenty-first transistor is electrically connected to the low level supply terminal; and a first terminal of the twenty-third resistor is electrically connected to a second high level supply terminal, and a second terminal of the twenty-third resistor is electrically connected to the output terminal of the second voltage detection circuit and the first electrode of the twenty-first transistor.

In some embodiments, the display module further includes a backlight source;

the at least one target part includes the backlight source, and the operation characteristic information of the backlight source during operation of the backlight source includes an operating current signal of the backlight source during the operation of the backlight source; and the detection module includes:

a fourth detection unit, which is configured to output, in response to control of a fourth detection signal and according to the operating current signal of the backlight source during the operation of the backlight source, seventh operation state information for indicating that the operating current of the backlight source is normal, or eighth operation state information for indicating that the operating current of the backlight source is abnormal; and the fourth detection unit is specifically configured to output the seventh operation state information when a current value of the operating current signal of the backlight source is within a first preset current range; and output the eighth operation state information when the current value of the operating current signal of the backlight source is outside the first preset current range.

In some embodiments, the fourth detection unit includes:

a sampling circuit, which has an input terminal electrically connected to the backlight source, is connected in series to the backlight source, and is configured to acquire an analog sampling voltage signal corresponding to the operating current signal of the backlight source;

a first signal processing subunit, which is configured to perform analog-to-digital conversion on the analog sampling voltage signal to obtain a corresponding digital sampling voltage signal, and detect, according to a voltage value of the corresponding digital sampling voltage signal, whether the current value of the operating current signal of the backlight source is within the first preset current range;

if the voltage value of the digital sampling voltage signal is within a second preset voltage range, the first signal processing subunit detects that the current value of the operating current signal of the backlight source is within the first preset current range, and outputs the seventh operation state information; and if the voltage value of the digital sampling voltage signal is outside the second preset voltage range, the first signal processing subunit detects that the current value of the operating current signal of the backlight source is outside the first preset current range, and outputs the eighth operation state information.

In some embodiments, the display module further includes a backlight driving component, and a power supply output terminal of the backlight driving component is electrically connected to a first terminal of the backlight source;

the backlight driving component includes a boost circuit and a boost control module, and the boost circuit includes an inductor, a boost control transistor, a rectifier diode and a thirtieth resistor;

a first terminal of the inductor is electrically connected to an input terminal of the boost circuit, and a second terminal of the inductor is electrically connected to an anode of the rectifier diode;

a gate of the boost control transistor is electrically connected to the boost control module, a first electrode of the boost control transistor is electrically connected to the anode of the rectifier diode, and a second electrode of the boost control transistor is electrically connected to a first terminal of the thirtieth resistor;

a second terminal of the thirtieth resistor is grounded;

a cathode of the rectifier diode is electrically connected to the power supply output terminal of the backlight driving component; and an input terminal of the sampling circuit is electrically connected to the first terminal of the thirtieth resistor.

In some embodiments, the backlight driving component includes a circuit board fixed with the boost circuit, and the sampling circuit and the boost circuit are fixed on the same circuit board; and the display module further includes a display control system component, and the first signal processing subunit is integrated in the display control system component.

In some embodiments, the display module further includes a backlight source;

the at least one target part includes the backlight source; the operation characteristic information of the backlight source during operation of the backlight source includes a current emission luminance of the backlight source during the operation of the backlight source; and the detection module includes;

a fifth detection unit, which is configured to output, in response to control of a fifth detection signal and according to the current emission luminance of the backlight source during the operation of the backlight source, ninth operation state information for representing that emission of the backlight source is normal, or tenth operation state information for representing that the emission of the backlight source is abnormal.

In some embodiments, the display module further includes a backlight driving component, the backlight driving component includes an emission control circuit, and a second terminal of the backlight source is electrically connected to a second operating voltage terminal through the emission control circuit;

the emission control circuit is configured to be controlled by an emission luminance control signal, such that a conductive path is formed between the second terminal of the backlight source and the second operating voltage terminal when the emission luminance control signal is in an active level state, and an open circuit is formed between the second terminal of the backlight source and the second operating voltage terminal when the emission luminance control signal is in a non-active level state; and the fifth detection unit includes:

a photosensor circuit, which is configured to acquire light emitted by the backlight source during the operation of the backlight source, and output a corresponding photosensitive electrical signal; and a second signal processing subunit, which is configured to determine, according to the photosensitive electrical signal output by the photosensor, the current emission luminance of the backlight source during the operation of the backlight source, and detect, according to the current emission luminance and a duty ratio of the emission luminance control signal currently received by the emission control circuit, whether the emission of the backlight source is normal or abnormal.

In some embodiments, the second signal processing subunit includes:

a luminance determining subunit, which is configured to determine, according to the photosensitive electrical signal, the current emission luminance of the backlight source during the operation of the backlight source;

a first judging subunit, which is configured to judge whether the current emission luminance is less than a first preset target luminance;

a calculation subunit, which is configured to, when the first judging subunit judges that the current emission luminance is less than the first preset target luminance, calculate, according to the current emission luminance and the duty ratio of the emission luminance control signal currently received by the emission control circuit, a duty ratio required for the emission luminance control signal when the backlight source presents a second preset target luminance, where the second preset target luminance is greater than or equal to the first preset target luminance;

a second judging subunit, which is configured to judge whether the duty ratio required for the emission luminance control signal when the backlight source presents the second preset target luminance is within a first preset duty ratio range; and a first fault detection subunit, which is configured to detect that the emission of the backlight source is normal when the second judging subunit judges that the duty ratio required for the emission luminance control signal when the backlight source presents the second preset target luminance is within the first preset duty ratio range; detect that the emission of the backlight source is abnormal when the second judging subunit judges that the duty ratio required for the emission luminance control signal when the backlight source presents the second preset target luminance is outside the first preset duty ratio range; and detect that the emission of the backlight source is normal when the first judging subunit judges that the current emission luminance is greater than or equal to the first preset target luminance.

In some embodiments, the backlight driving component further includes:

a luminance control signal supply unit, which is electrically connected to the emission control circuit and configured to supply the emission luminance control signal to the emission control circuit; and the second signal processing subunit includes:

a luminance determining subunit, which is configured to determine, according to the photosensitive electrical signal, the current emission luminance of the backlight source during the operation of the backlight source;

a luminance judging subunit, which is configured to judge whether the current emission luminance is within a preset target luminance range;

a duty ratio adjusting subunit, which is configured to increase, when the luminance judging subunit judges that the current emission luminance is less than a minimum value of the preset target luminance range, the duty ratio of the emission luminance control signal according to a first preset adjustment algorithm; and reduce, when the luminance judging subunit judges that the current emission luminance is greater than a maximum value of the preset target luminance range, the duty ratio of the emission luminance control signal according to a second preset adjustment algorithm;

a third judging subunit, which is configured to judge whether the duty ratio of the emission luminance control signal adjusted by the duty ratio adjusting subunit is within a second preset duty ratio range;

a first control subunit, which is configured to, when the third judging subunit judges that the duty ratio of the emission luminance control signal adjusted by the duty ratio adjusting subunit is within the second preset duty ratio range, control the luminance control signal supply unit to output the emission luminance control signal with the duty ratio adjusted by the duty ratio adjusting subunit to the emission control circuit, and control the photosensor circuit to acquire again light emitted by the backlight source during the operation of the backlight source; and a first fault detection subunit, which is configured to detect that the emission of the backlight source is abnormal when the third judging subunit judges that the duty ratio of the emission luminance control signal adjusted by the duty ratio adjusting subunit is outside the second preset duty ratio range; and detect that the emission of the backlight source is normal when the luminance judging subunit judges that the current emission luminance is within the preset target luminance range.

In some embodiments, the display module further includes a calculation component and a display control system component;

the at least one target part includes the calculation component; the operation characteristic information of the calculation component during operation of the calculation component includes a horizontal synchronization signal and/or a vertical synchronization signal in a process of transmitting a display data signal by the calculation component to the display control system component; and the detection module includes:

a sixth detection unit, which is configured to output, in response to control of a sixth detection signal and according to the horizontal synchronization signal and/or the vertical synchronization signal, eleventh operation state information for indicating that a process of providing the display data signal by the calculation component to the display control system component is normal, or twelfth operation state information for indicating that the process of providing the display data signal by the calculation component to the display control system component is abnormal.

In some embodiments, the sixth detection unit includes:

a frequency determining subunit, which is configured to determine, according to the horizontal synchronization signal, a line frequency at which the calculation component transmits the display data signal, and determine, according to the vertical synchronization signal, a frame frequency at which the calculation component transmits the display data signal;

a fourth judging subunit, which is configured to judge whether the line frequency determined by the frequency determining subunit is within a preset line frequency range, and whether the frame frequency determined by the frequency determining subunit is within a preset frame frequency range; and a second fault detection subunit, which is configured to detect that the process of providing the display data signal by the calculation component to the display control system component is normal, when the fourth judging subunit judges that the line frequency determined by the frequency determining subunit is within the preset line frequency range and the frame frequency determined by the frequency determining subunit is within the preset frame frequency range; and detect that the process of providing the display data signal by the calculation component to the display control system component is abnormal, when the fourth judging subunit judges that the line frequency determined by the frequency determining subunit is outside the preset line frequency range and/or the fourth judging subunit judges that the frame frequency determined by the frequency determining subunit is outside the preset frame frequency range.

In some embodiments, the display module further includes a display control system component and a timing control component;

the at least one target part includes the display control system component; the operation characteristic information of the display control system component during operation of the display control system component includes a handshake signal transmitted by the display control system component to the timing control component; and the detection module includes:

a seventh detection unit, which is configured to output, in response to control of a seventh detection signal and according to a condition of the handshake signal received by the timing control component in a detection period, thirteenth operation state information for representing that outputting a signal by the display control system component to the timing control component is normal, or fourteenth operation state information for representing that the outputting a signal by the display control system component to the timing control component is abnormal.

In some embodiments, the seventh detection unit includes:

a fifth judging subunit, which is configured to judge whether a frequency of receiving the handshake signal by the timing control component in the detection period is within a preset frequency range;

a third fault detection subunit, which is configured to detect that the outputting a signal by the display control system component to the timing control component is normal, when the fifth judging subunit judges that the frequency of receiving the handshake signal by the timing control component in the detection period is within the preset frequency range; and detect that the outputting a signal by the display control system component to the timing control component is abnormal, when the fifth judging subunit judges that the frequency of receiving the handshake signal by the timing control component in the detection period is outside the preset frequency range.

In some embodiments, the handshake signal include a LOCKN signal.

In some embodiments, the seventh detection unit is integrated in the timing control component; and an output terminal of the seventh detection unit is electrically connected to the display control system component, to transmit the thirteenth operation state information or the fourteenth operation state information generated by the seventh detection unit to the display control system component.

In some embodiments, the display module further includes a display control system component and a timing control component;

the at least one target part includes the display control system component; the operation characteristic information of the display control system component during operation of the display control system component includes a display data signal of an image to be displayed, acquired by the timing control component from the display control system component; and the detection module includes:

an eighth detection unit, which is configured to, in response to control of an eighth detection signal and according to a display data signal of an image to be displayed before a screen switching and a display data signal of an image to be displayed after the screen switching, acquired by the timing control component from the display control system component, fifteenth operation state information for representing that performing the screen switching by the display control system component is normal, or sixteenth operation state information for representing that the performing the screen switching by the display control system component is abnormal.

In some embodiments, the display module further includes a calculation component; and the eighth detection unit includes:

a second control subunit, which is configured to control the calculation component to transmit a display data signal of a first image to the display control system component, and control the timing control component to acquire the display data signal of the image to be displayed from the display control system component and perform feature extraction on the acquired display data signal to obtain first display feature information;

a third control subunit, which is configured to control the calculation component to transmit a display data signal of a second image to the display control system component, and control the timing control component to acquire the display data signal of the image to be displayed from the display control system component and perform feature extraction on the acquired display data signal to obtain second display feature information; and a fourth fault detection subunit, which configured to detect, according to a difference between the first display feature information and the second display feature information, whether the performing the screen switching by the display control system component is normal or abnormal.

In some embodiments, the timing control component is configured to, in response to control of the second control subunit or the third control subunit, perform luminance feature extraction on the acquired display data signal;

the first display feature information includes first luminance information, and the second display feature information includes second luminance information;

the fourth fault detection subunit is specifically configured to detect, according to a difference value between the first luminance information and the second luminance information, whether the performing the screen switching by the display control system component is normal or abnormal;

when the difference value is greater than a preset target difference value, it is detected that the performing the screen switching by the display control system component is normal; and when the difference value is less than or equal to the preset target difference value, it is detected that the performing the screen switching by the display control system component is abnormal.

In some embodiments, the first luminance information includes a first luminance function value, and the second luminance information includes a second luminance function value; and the difference value between the first luminance information and the second luminance information is a quotient of an absolute value of a difference between the second luminance function value and the first luminance function value and a sum of the second luminance function value and the first luminance function value.

In some embodiments, the display module further includes a power component, a display control system component, a calculation component, a timing control component, and a backlight driving component; and at least two of the power component, the display control system component, the calculation component, the timing control component, and the backlight driving component are on a same circuit board.

In a second aspect, an embodiment of the present disclosure further provides a display device, including the display module as provided in the above first aspect.

In a third aspect, an embodiment of the present disclosure further provides a display system, including the display device as provided in the second aspect described above and a receiving device;

where the receiving device is configured to receive the operation state information transmitted by the transmission module.

DETAIL DESCRIPTION OF EMBODIMENTS

In order to enable one of ordinary skill in the art to better understand the technical solutions of the present disclosure, a display module, a display device, and a display system provided by the present disclosure will be further described in detail below with reference to the accompanying drawings.

Unless defined otherwise, technical or scientific terms used in the present disclosure shall have the ordinary meaning as understood by one of ordinary skill in the art to which the present disclosure belongs. The words "first", "second", and the like used in the present disclosure are not intended to indicate any order, quantity, or importance, but rather serve to distinguish one element from another. Also, the word "a", "an", "the" or the like does not denote a limitation of quantity, but rather denotes the presence of at least one. The word "including", "includes", or the like means that the element or item preceding the word includes the element or item listed after the word and its equivalent, but does not exclude other elements or items. The word "connected", "coupled" or the like is not restricted to physical or mechanical connections, but may include electrical connections, whether direct or indirect. The words "upper", "lower", "left", "right", and the like are used only to indicate relative positional relationships, and when the absolute position of the object being described is changed, the relative positional relationships may also be changed accordingly.

An embodiment of the present disclosure provides a display module with a fault self-diagnosis function, which can automatically report an operation state information of a target part, facilitating operation and maintenance personnel to operate and maintain a display product according to the received "operation state information", and improving operation and maintenance efficiency.

Figure 1:
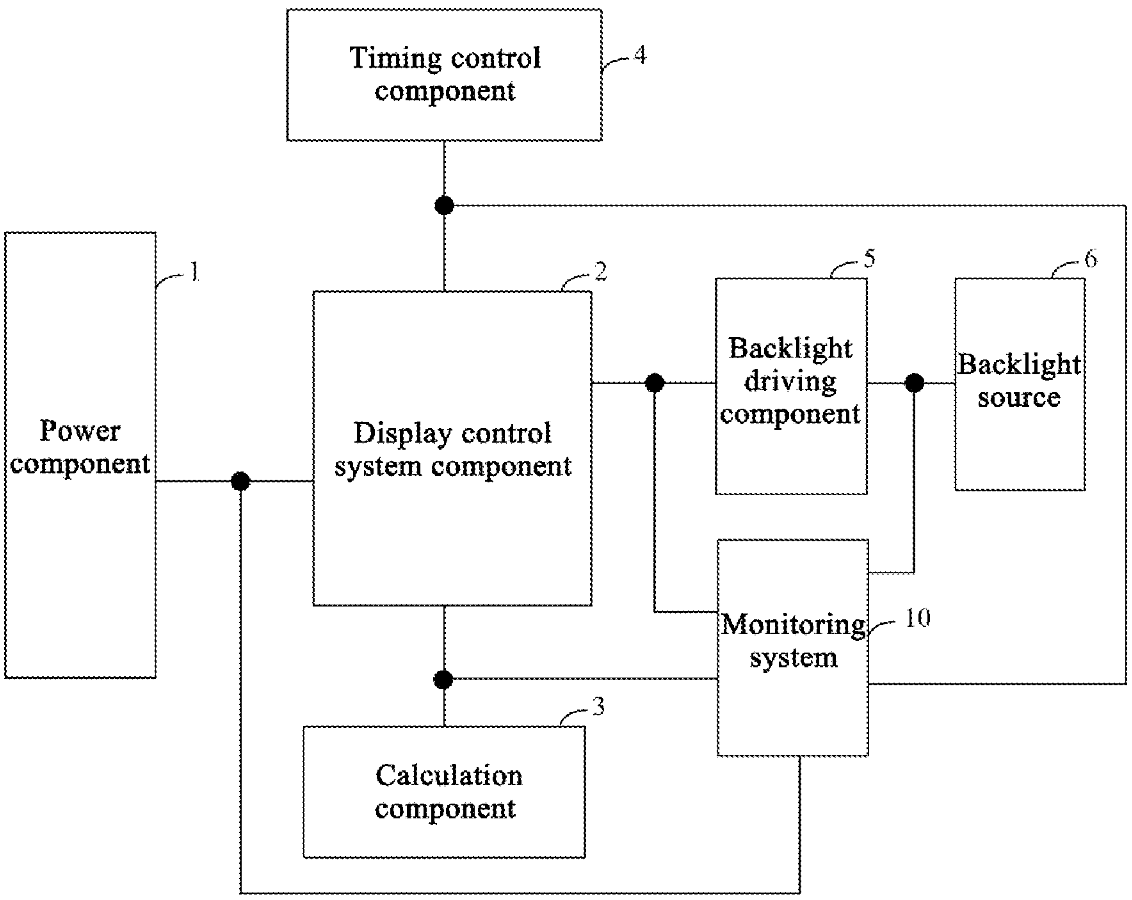
FIG. 1 is a block diagram illustrating a structure of a display module in an embodiment of the present disclosure.
Figure 2:
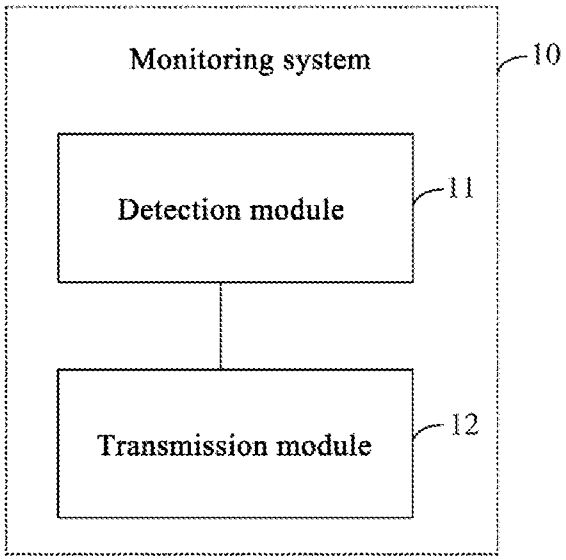
FIG. 2 is a block diagram illustrating a structure of a monitoring system in an embodiment of the present disclosure.

FIG. 1 is a block diagram illustrating a structure of a display module in an embodiment of the present disclosure. FIG. 2 is a block diagram illustrating a structure of a monitoring system in an embodiment of the present disclosure. As shown in FIGS. 1 and 2, the display module includes a monitoring system, and the monitoring system 10 includes a detection module 11 and a transmission module 12.

The detection module 11 is configured to detect operation characteristic information of each of at least one target part in the display module during operation of the target part, and determine operation state information of the target part according to the operation characteristic information of the target part. The transmission module 12 is configured to transmit out the operation state information.

In an embodiment of the present disclosure, the detection module 11 and the transmission module 12 may be implemented as software, hardware, or a combination of software and hardware.

The transmission module 12 may transmit the operation state information of the target part to a target object through network. The network may include various types such as wired communication links, wireless communication links (e.g., WIFI, LTE_4G network, NR_5G network), or fiber optic cables. The target object may be a server or a specific terminal (e.g., an electronic apparatus such as a mobile phone, a tablet, or a computer, which is available for the operation and maintenance personnel to refer to the information). The technical solution of the present disclosure does not limit the communication technology employed by the transmission module 12 to transmit the operation state information and the target object to receive the operation state information.

In the embodiment of the present disclosure, through providing the detection module 11 and the transmission module 12 described above, the display module can have the fault self-diagnosis function, and the operation state information of the target part can be transmitted to the operation and maintenance personnel for reference, so that the operation and maintenance personnel are not required to inspect on-site on whether a fault occurs in the display product, which is convenient for the operation and maintenance personnel to perform operation and maintenance on the display product, and favorable to promoting the operation and maintenance efficiency.

In some embodiments, the display module includes a power component 1, a display control system component 2, a calculation component 3, a timing control component 4, a backlight driving component 5 and a backlight source 6. The at least one target part includes at least one of the power component 1, the display control system component 2, the calculation component 3, the timing control component 4, the backlight driving component 5, and the backlight source 6.

The power component 1 is a part for supplying power in the display module, and specifically may directly or indirectly supply power to part of the components in the display module. The display control system component 2 may also be referred to as a motherboard, which is a core part in the display module and generally serves to control coordination of the other components in the display module, and an entity of the display control system component 2 is a circuit board fixed with a display control system on chip, for example, a MST9U01 chip. The calculation component 3 serves as a capture part of the display control system component 2, and is generally configured to capture a display data signal input by an external signal source and transmit the display data signal to the display control system component 2 according to a certain rule. The timing control component 4 serves to provide a control timing, to control coordination of various drivers (e.g., source driver, gate driver, etc.) in the display module. The backlight driving component 5 serves to drive the backlight source 6 to emit light. The backlight source 6 emits light in response to the control of the backlight driving component 5, and the backlight source 6 generally includes a plurality of lamp strips connected in parallel.

It should be noted that, the power component 1, the display control system component 2, the calculation component 3, the timing control component 4, the backlight driving component 5, and the backlight source 6 described above are merely distinguished from each other based on different functions. In an actual product, the power component 1, the display control system component 2, the calculation component 3, the timing control component 4, the backlight driving component 5, and the backlight source 6 may exist in the display module as independent structures, or two or more of them may be integrated and exist in a same structure. The specific implementations of the power component 1, the display control system component 2, the calculation component 3, the timing control component 4, the backlight driving component 5, and the backlight source 6 are not limited by the present disclosure.

Figure 3:
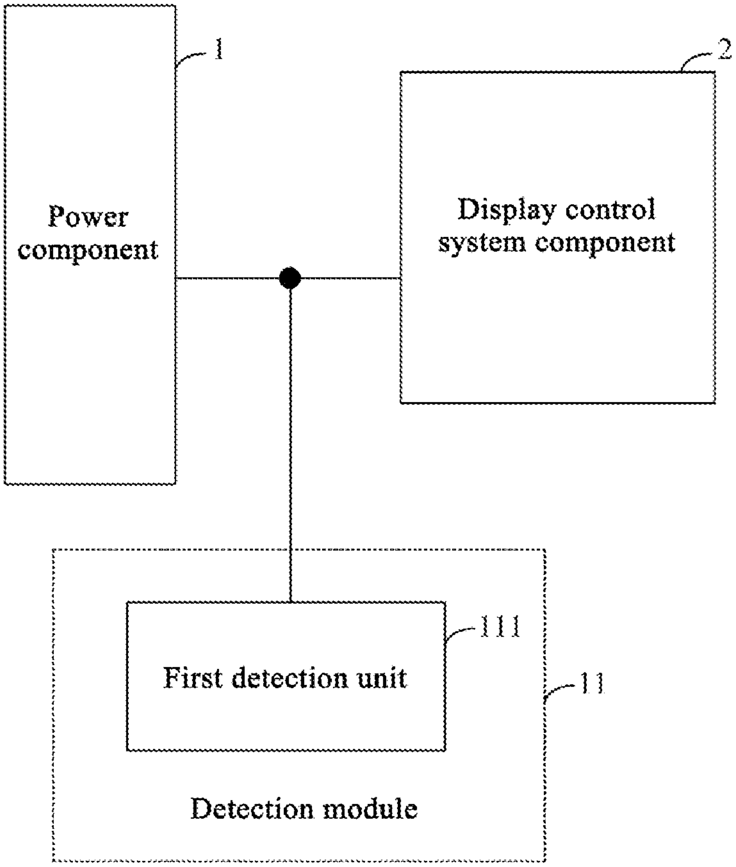
FIG. 3 is a block diagram illustrating a structure of a detection module in an embodiment of the present disclosure.

FIG. 3 is a block diagram illustrating a structure of a detection module in an embodiment of the present disclosure. As shown in FIG. 3, in some embodiments, the at least one target part includes the power component 1. The operation characteristic information of the power component 1 during operation thereof includes a control system voltage signal in each first power supply channel for supplying power by the power component 1 to the display control system component 2. The detection module 11 includes a first detection unit 111.

The first detection unit 111 is connected to each first power supply channel, and the first detection unit 111 is configured to output, in response to control of a first detection signal and according to a condition of the control system voltage signal loaded on the first power supply channel, first operation state information indicating that supplying power by the power component 1 to the display control system component 2 is normal, or second operation state information indicating that the supplying power by the power component 1 to the display control system component 2 is abnormal.

Optionally, when each first power supply channel is loaded with a corresponding control system voltage signal, it indicates that the supplying power by the power component 1 to the display control system component 2 is normal; and when at least one first power supply channel is not loaded with a corresponding control system voltage signal, it indicates that the supplying power by the power component 1 to the display control system component 2 is abnormal.

Figure 4:
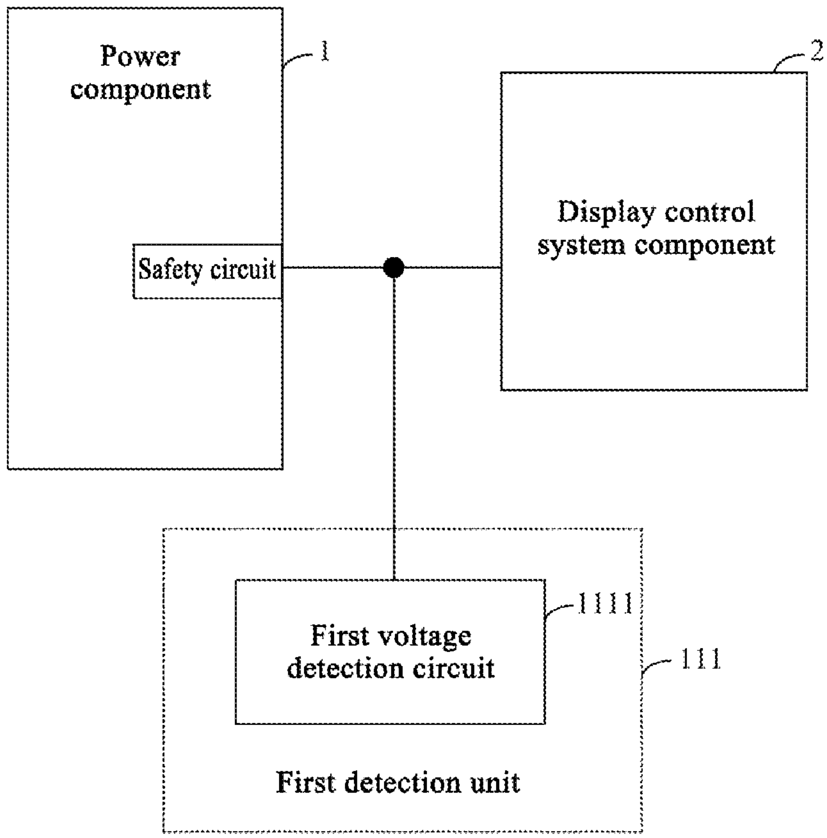
FIG. 4 is a block diagram illustrating a structure of a first detection unit in an embodiment of the present disclosure.

FIG. 4 is a block diagram illustrating a structure of a first detection unit in an embodiment of the present disclosure. As shown in FIG. 4, as an alternative embodiment, there is one first power supply channel for supplying power by the power component 1 to the display control system component 2. The first detection unit 111 includes a first voltage detection circuit 1111. An input terminal of the first voltage detection circuit 1111 is electrically connected to the first power supply channel, and the first voltage detection circuit 1111 is configured to output first operation state information when a control system voltage signal is loaded on the first power supply channel and output second operation state information when the control system voltage signal is not loaded on the first power supply channel.

Figure 5A:
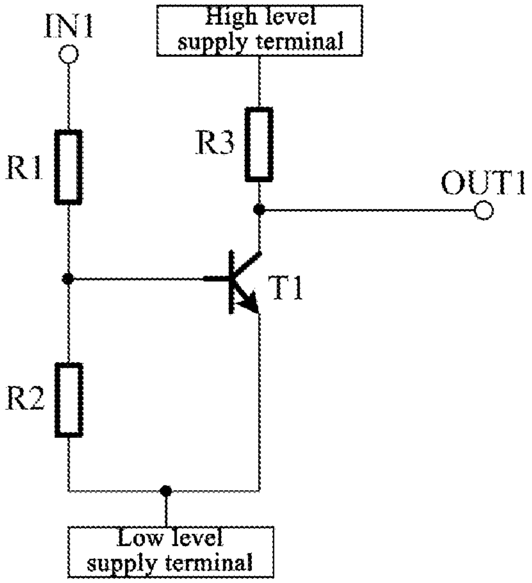
FIG. 5A is a schematic diagram illustrating a circuit structure of a first voltage detection circuit in an embodiment of the present disclosure.

FIG. 5A is a schematic diagram illustrating a circuit structure of a first voltage detection circuit in an embodiment of the present disclosure. As shown in FIG. 5A, in some embodiments, the first voltage detection circuit 1111 includes a first resistor R1, a second resistor R2, a third resistor R3 and a first transistor T1.

A first terminal of the first resistor R1 is electrically connected to an input terminal IN1 of the first voltage detection circuit 1111, and a second terminal of the first resistor R1 is electrically connected to a first terminal of the second resistor R2 and a gate of the first transistor T1.

The first terminal of the second resistor R2 is electrically connected to the gate of the first transistor T1, and a second terminal of the second resistor R2 is electrically connected to a low level supply terminal.

A first electrode of the first transistor T1 is electrically connected to an output terminal OUT1 of the first voltage detection circuit 1111, and a second electrode of the first transistor T1 is electrically connected to the low level supply terminal. The first transistor T1 may be an N-type transistor or a P-type transistor.

A first terminal of the third resistor R3 is electrically connected to a first high level supply terminal, and a second terminal of the third resistor R3 is electrically connected to the output terminal OUT1 of the first voltage detection circuit 1111 and the first electrode of the first transistor T1.

As one example, the first transistor T1 may be an N-type transistor. When the input terminal of the first voltage detection circuit 1111 is input with a corresponding control system voltage signal, the first transistor T1 is turned on, a low level signal provided by the low level supply terminal is written to the output terminal of the first voltage detection circuit 1111 through the first transistor T1, and the output terminal OUT1 of the first voltage detection circuit 1111 outputs the low level signal. When the input terminal IN1 of the first voltage detection circuit 1111 is not input with the corresponding control system voltage signal, the first transistor T1 is turned off, a high level signal provided by the first high level supply terminal is written to the output terminal OUT1 of the first voltage detection circuit 1111 through the third resistor R3, and the output terminal OUT1 of the first voltage detection circuit 1111 outputs the high level signal.

That is, when the input terminal IN1 of the first voltage detection circuit 1111 is input with a corresponding control system voltage signal (that is, the first power supply channel is loaded with the corresponding control system voltage signal), the output terminal OUT1 of the first voltage detection circuit 1111 outputs a low level signal to represent the first operation state information; and when the input terminal IN1 of the first voltage detection circuit 1111 is not input with the corresponding control system voltage signal (that is, the first power supply channel is not loaded with the corresponding control system voltage signal), the output terminal of the first voltage detection circuit 1111 outputs a high level signal to represent the second operation state information.

In the case shown in FIG. 5A, a resistance value r1 of the first resistor R1 and a resistance value r2 of the second resistor R2 satisfy:

$$(V1-VL)*r2/(r1+r2)\geq \text{Vth\_T1\_N},$$

where V1 is a voltage of the control system voltage signal, which should be provided by the first power supply channel connected to the first voltage detection circuit 1111, VL is a low level voltage provided by the low level supply terminal, and Vth_T1_N is a threshold voltage of the first transistor T1.

Figure 5B:
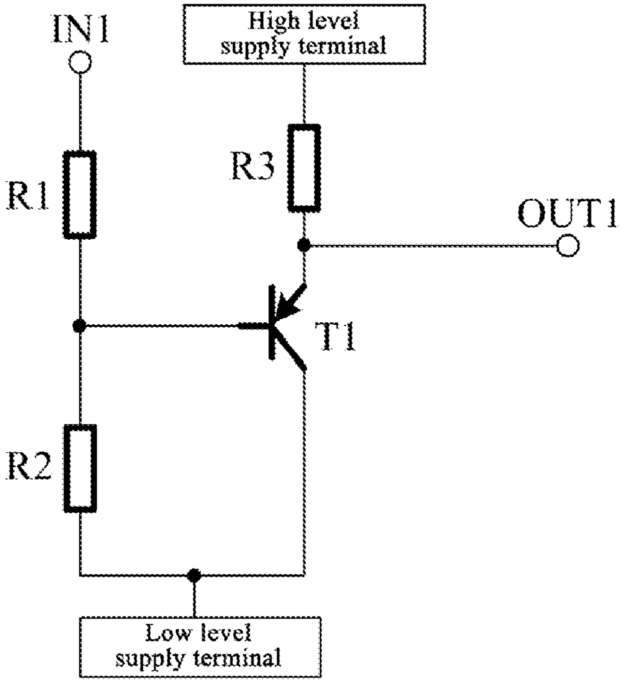
FIG. 5B is a schematic diagram illustrating another circuit structure of the first voltage detection circuit in an embodiment of the present disclosure.

FIG. 5B is schematic diagram illustrating another circuit structure of the first voltage detection circuit in an embodiment of the present disclosure. As shown in FIG. 5B, unlike the case shown in FIG. 5A, the first transistor T1 in the case shown in FIG. 5B is a P-type transistor.

When the input terminal IN1 of the first voltage detection circuit 1111 is input with a corresponding control system voltage signal, the first transistor T1 is turned off, a high level signal provided by the first high level supply terminal is written to the output terminal of the first voltage detection circuit 1111 through the third resistor R3, and the output terminal OUT1 of the first voltage detection circuit 1111 outputs the high level signal. When the input terminal IN1 of the first voltage detection circuit 1111 is not input with the corresponding control system voltage signal, a low level signal provided by the low level supply terminal is written to the gate of the P-type transistor through the second resistor R2, the first transistor T1 is turned on, the low level signal provided by the low level supply terminal is written to the output terminal OUT1 of the first voltage detection circuit 1111 through the first transistor T1, and the output terminal OUT1 of the first voltage detection circuit 1111 outputs the low level signal.

That is, when the input terminal IN1 of the first voltage detection circuit 1111 is input with a corresponding control system voltage signal (that is, the first power supply channel is loaded with the corresponding control system voltage signal), the output terminal OUT1 of the first voltage detection circuit 1111 outputs a high level signal to represent the first operation state information; and when the input terminal IN1 of the first voltage detection circuit 1111 is not input with the corresponding control system voltage signal (that is, the first power supply channel is not input with the corresponding control system voltage signal), the output terminal OUT1 of the first voltage detection circuit 1111 outputs a low level signal to represent the second operation state information.

In the case shown in FIG. 5B, a resistance value r1 of the first resistor R1 and a resistance value r2 of the second resistor R2 satisfy:

$$(V1-VL)*r2/(r1+r2)\geq \text{Vth\_T1\_P},$$

where V1 is a voltage of the control system voltage signal, which should be provided by the first power supply channel connected to the first voltage detection circuit 1111, VL is a low level voltage provided by the low level supply terminal, and Vth_T1_P is a threshold voltage of the first transistor T1.

In the cases shown in FIGS. 5A and 5B, VL may specifically be a ground voltage (generally indicated by VSS), which is approximately 0V in magnitude. A resistance value r3 of the third resistor R3 satisfies r3≥2.5KΩ, and the third resistor R3 serves to limit current to prevent an excessive current at the output terminal of the first voltage detection circuit 1111.

Figure 5C:
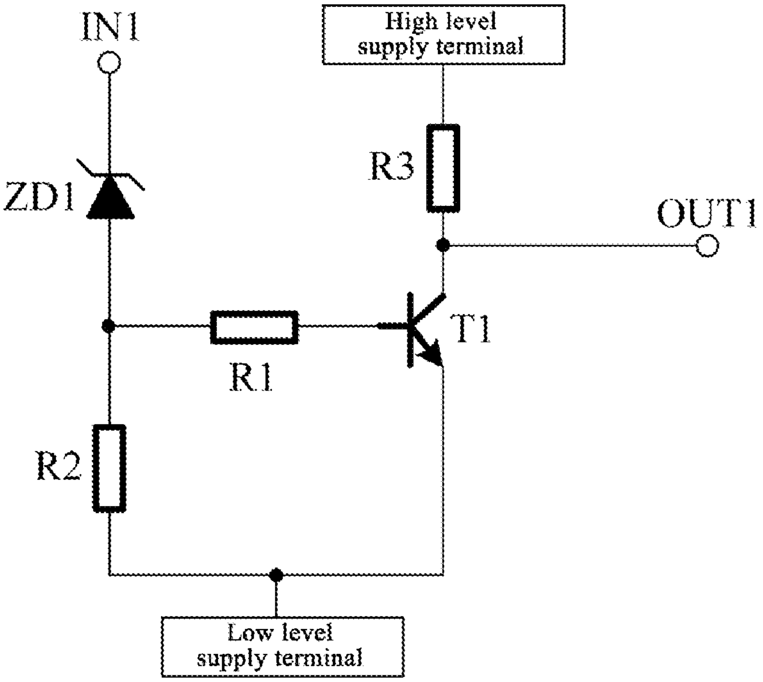
FIG. 5C is a schematic diagram illustrating yet another circuit structure of the first voltage detection circuit in an embodiment of the present disclosure.

FIG. 5C is a schematic diagram illustrating yet another circuit structure of the first voltage detection circuit in an embodiment of the present disclosure. As shown in FIG. 5C, the first voltage detection circuit 1111 includes a first resistor R1, a third resistor R3, a first transistor T1, and a first zener diode ZD1.

A cathode of the first zener diode ZD1 is electrically connected to the input terminal of the first voltage detection circuit 1111, an anode of the first zener diode ZD1 is electrically connected to a first terminal of the first resistor R1, and a breakdown voltage of the first zener diode ZD1 is less than the voltage of the control system voltage signal, which should be provided by the first power supply channel connected to the first voltage detection circuit 1111.

A second terminal of the first resistor R1 is electrically connected to a gate of the first transistor T1.

A first electrode of the first transistor T1 is electrically connected to an output terminal of the first voltage detection circuit 1111, a second electrode of the first transistor T1 is electrically connected to a low level supply terminal, and the first transistor T1 is an N-type transistor.

A first terminal of the third resistor R3 is electrically connected to a first high level supply terminal, and a second terminal of the third resistor R3 is electrically connected to the output terminal of the first voltage detection circuit 1111 and the first electrode of the first transistor T1.

In some embodiments, the first voltage detection circuit 1111 further includes a second resistor R2. A first terminal of the second resistor R2 is electrically connected to the anode of the first zener diode ZD1 and the first terminal of the first resistor R1, and a second terminal of the second resistor R2 is electrically connected to the low level supply terminal.

The operation principle of the first voltage detection circuit 1111 shown in FIG. 5C is similar to that of the first voltage detection circuit 1111 shown in FIG. 5A. That is, when the input terminal IN1 of the first voltage detection circuit 1111 is input with a corresponding control system voltage signal, the output terminal OUT1 of the first voltage detection circuit 1111 outputs a low level signal; and when the input terminal IN1 of the first voltage detection circuit 1111 is not input with the corresponding control system voltage signal, the output terminal OUT1 of the first voltage detection circuit 1111 outputs a high level signal.

It should to be noted that the first voltage detection circuit 1111 may have another circuit structure in an embodiment of the present disclosure, but any detection circuit that can detect whether or not a certain signal is present may be used as the first voltage detection circuit 1111 in the present disclosure. Examples will not be listed for description in the present disclosure.

Figure 6:
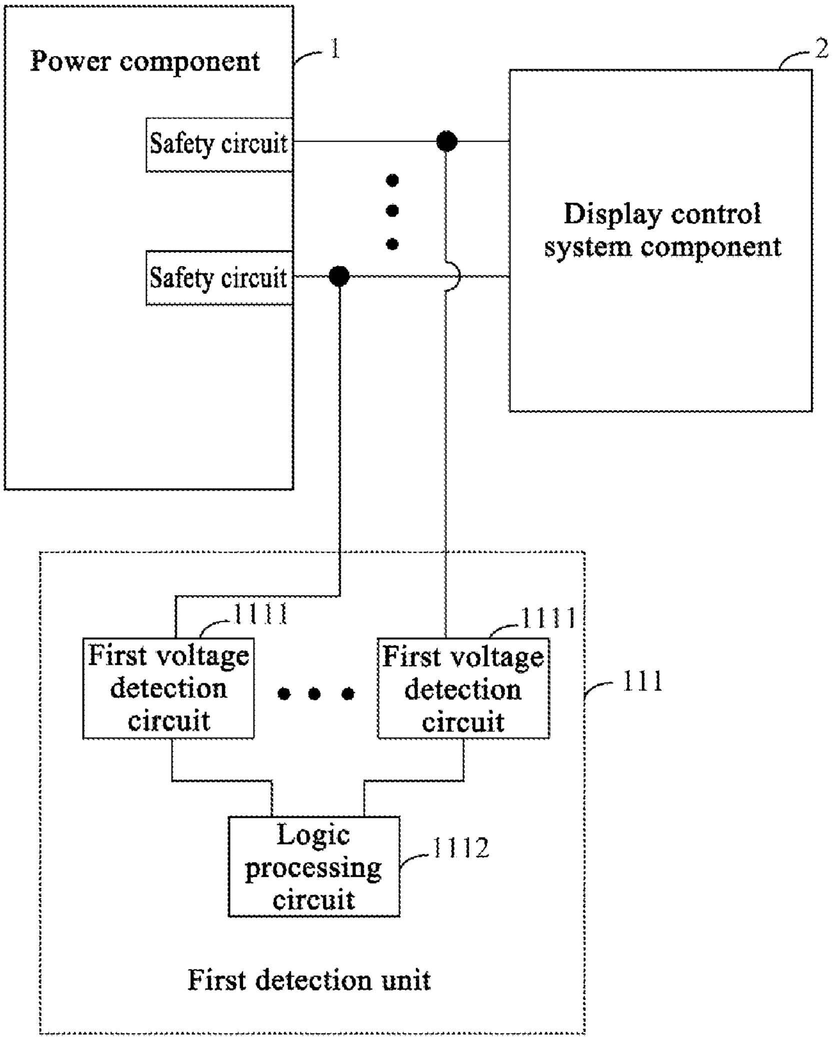
FIG. 6 is a block diagram illustrating another structure of the first detection unit in an embodiment of the present disclosure.

FIG. 6 is a block diagram illustrating another structure of the first detection unit in an embodiment of the present disclosure. As shown in FIG. 6, unlike the previous embodiment in which there is only one first power supply channel for supplying power by the power component 1 to the display control system component 2, as another alternative embodiment of the present disclosure, there are at least two first power supply channels for supplying power by the power component 1 to the display control system component 2.

In some embodiments, the at least two first power supply channels for supplying power by the power component 1 to the display control system component 2 may include a power supply channel for supplying a display control system component operating voltage (generally 5V) to the display control system component, and a power supply channel for supplying a display panel operating voltage (generally 12V) to the display control system component (the corresponding operating voltage is subsequently output to the display panel by the display control system component). Apparently, in an embodiment of the present disclosure, another first power supply channel is established between the power component 1 and the display control system component 2, for the power component 1 to supply a required voltage to the display control system component 2.

In this case, the first detection unit 111 includes a logic processing circuit 1112 and at least two first voltage detection circuits 1111 in one-to-one correspondence with the at least two first power supply channels. An input terminal of each of the first voltage detection circuits 1111 is electrically connected to a corresponding first power supply channel, and the output terminal of the first voltage detection circuit 1111 is electrically connected to an input terminal of the logic processing circuit 1112.

The first voltage detection circuit 1111 is configured to output a first level signal when the corresponding first power supply channel is loaded with a control system voltage signal, and output a second level signal when the corresponding first power supply channel is not loaded with the control system voltage signal. One of the first level signal and the second level signal is a high level signal, and the other of the first level signal and the second level signal is a low level signal.

The logic processing circuit 1112 is configured to output the first operation state information when each of the electrically connected first voltage detection circuits 1111 outputs a first level signal, and to output the second operation state information when at least one of the first voltage detection circuits 1111 outputs a second level signal.

It should be noted that any one of the first voltage detection circuits 1111 in the first detection unit 111 shown in FIG. 6 may be any one of the first voltage detection circuits 1111 shown in FIGS. 5A to 5C. In FIG. 6, the voltages of the "control system voltage signals" detected by the different first voltage detection circuits 1111 are different, and therefore the specific resistance values of the first resistors R1 and the second resistors R2 provided in the different first voltage detection circuits 1111 are different. Apparently, any one of the first voltage detection circuits 1111 in FIG. 6 may alternatively adopt other detection circuits that can be used for detecting whether a certain signal is present. For the related description of the first voltage detection circuit 1111, reference may be made to the contents in the foregoing embodiments, and details are not repeated herein. Only the logic processing circuit 1112 is described in detail below.

As an alternative embodiment, in FIG. 6, the first level signal output by the first voltage detection circuit 1111 is a low level signal, and the second level signal output by the first voltage detection circuit 1111 is a high level signal (in this case, the first voltage detection circuit may adopt that shown in FIG. 5A or 5C). The logic processing circuit 1112 is an OR gate circuit, a low level signal output by the logic processing circuit 1112 represents the first operation state information, and a high level signal output by the logic processing circuit 1112 represents the second operation state information.

The OR gate circuit has a plurality of input terminals and one output terminal. The output terminal is at a high level (logic "1") as long as one of the input terminals is at a high level (logic "1"); and the output terminal is at a low level (logic "0") only if each of the input terminals is at a low level (logic "0").

As another alternative, in FIG. 6, the first level signal output by the first voltage detection circuit 1111 is a high level signal, and the second level signal output by the first voltage detection circuit 1111 is a low level signal (in this case, the first voltage detection circuit may adopt that shown in FIG. 5B). The logic processing circuit 1112 is an AND gate circuit, and a high level signal output by the logic processing circuit 1112 represents the first operation state information, and a low level signal output by the logic processing circuit 1112 represents the second operation state information.

The AND gate circuit has a plurality of input terminals and an output terminal. When each of the input terminals is at a high level (logic "1") at the same time, the output terminal is at a high level; otherwise, the output terminal is at a low level (logic "0)").

It should be noted that the specific circuit structures of the AND gate circuit and the OR gate circuit are not limited by the technical solution of the present disclosure.

In some embodiments, a safety circuit is disposed in the first power supply channel, a first terminal of the safety circuit is electrically connected to the power component 1, and a second terminal of the safety circuit is electrically connected to the display control system component 2. The first detection unit 111 is electrically connected to the second terminal of the safety circuit.

The safety circuit is arranged in the power component 1, and specifically includes a fuse. The safety circuit is configured to open (cut off) the corresponding first power supply channel when a current in the corresponding first power supply channel exceeds a set rated current, to prevent electrical devices in the power component 1 and/or the display control system component 2 from being damaged due to the excessive current in the first power supply channel.

In some embodiments, the first detection unit 111 is integrated in the display control system component 2. Specifically, each electrical device (for example, a resistor, a capacitor, a transistor, etc.) in the first detection unit 111 may be integrated on a circuit board in the display control system component 2 and located at a periphery of a display control system chip, and electrically connected to a part of external terminals of the display control system chip according to actual needs, so that a signal can be transmitted between the first detection unit 111 and the display control system component 2.

It should be noted that, since the display control system component 2 is generally provided with a standby power supply module, even when the supplying power by the power component 1 to the display control system component 2 is abnormal, the display control system component 2 can be maintained to operate for a certain period of time by the power supplied from the standby power supply module. When the first detection unit 111 is integrated in the display control system component 2, an output terminal of the standby power supply module built in the display control system component 2 can be used as the first high level supply terminal.

Based on the foregoing, it can be seen that, through the first detection unit 111, whether a fault occurs in supplying power by the power component 1 to the display control system component 2 can be effectively detected, and the first operation state information for representing that the supplying power by the power component 1 to the display control system component 2 is normal, or the second operation state information for representing that the supplying power by the power component 1 to the display control system component 2 is abnormal can be output, facilitating the operation and maintenance personnel to operate and maintain the display product according to the received "operation state information", and improving the operation and maintenance efficiency.

Figure 7:
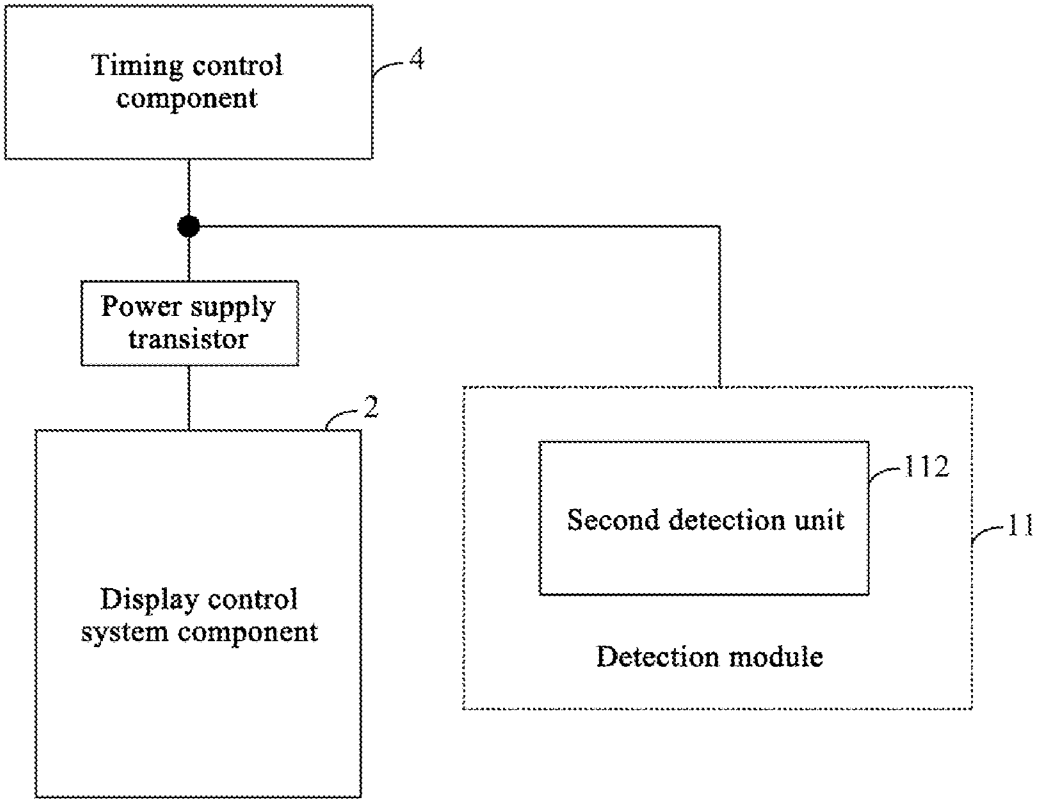
FIG. 7 is a block diagram illustrating another structure of the detection module in an embodiment of the present disclosure.

FIG. 7 is a block diagram illustrating another structure of the detection module in an embodiment of the present disclosure. As shown in FIG. 7, in some embodiments, the at least one target part includes the display control system component 2, and the operation characteristic information of the display control system component 2 during operation of the display control system component 2 includes a timing controller voltage signal in a second power supply channel for supplying power by the display control system component 2 to the timing control component 4. The detection module 11 includes a second detection unit 112.

The second detection unit 112 is connected to the second power supply channel, and the second detection unit 112 is configured to output, in response to control of a second detection signal and according to a condition of the timing controller voltage signal loaded in the second power supply channel, third operation state information for indicating that supplying power by the display control system component 2 to the timing control component 4 is normal, or fourth operation state information for indicating that the supplying power by the display control system component 2 to the timing control component 4 is abnormal.

Optionally, when the second power supply channel is loaded with a timing controller voltage signal, it indicates that the supplying power by the display control system component 2 to the timing control component 4 is normal; and when the second power supply channel is not loaded with the timing controller voltage signal, it indicates that the supplying power by the display control system component 2 to the timing control component 4 is abnormal.

Figure 8A:
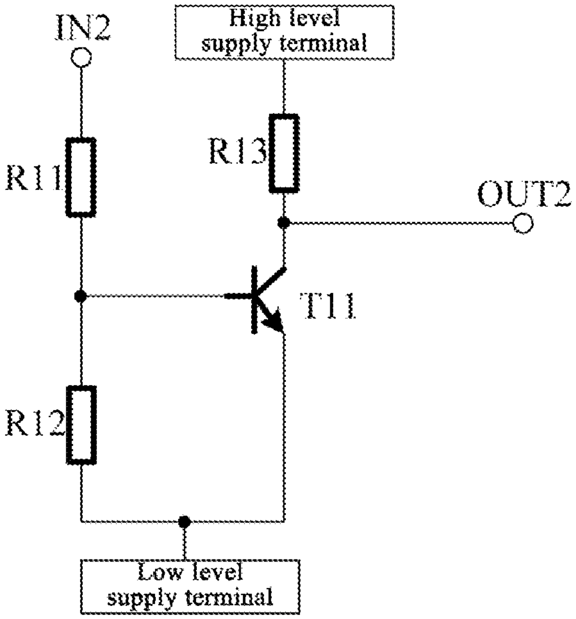
FIG. 8A is a schematic diagram illustrating a circuit structure of a second voltage detection circuit in an embodiment of the present disclosure.

FIG. 8A is a schematic diagram illustrating a circuit structure of a second voltage detection circuit in an embodiment of the present disclosure. As shown in FIG. 8A, in some embodiments, the second detection unit 112 includes a second voltage detection circuit. An input terminal IN2 of the second voltage detection circuit is electrically connected to the second power supply channel, and the second voltage detection circuit is configured to output the third operation state information when the second power supply channel is loaded with the timing controller voltage signal, and output the fourth operation state information when the second power supply channel is not loaded with the timing controller voltage signal. One of the third operation state information and the fourth operation state information is a high level signal, and the other of the third operation state information and the fourth operation state information is a low level signal.

In some embodiments, the second voltage detection circuit includes an eleventh resistor R11, a twelfth resistor R12, a thirteenth resistor R13, and an eleventh transistor T11.

A first terminal of the eleventh resistor R11 is electrically connected to the input terminal IN2 of the second voltage detection circuit, and a second terminal of the eleventh resistor R11 is electrically connected to a first terminal of the twelfth resistor R12 and a gate of the eleventh transistor T11.

A first terminal of the twelfth resistor R12 is electrically connected to the gate of the eleventh transistor T11, and a second terminal of the twelfth resistor R12 is electrically connected to a low level supply terminal.

A first electrode of the eleventh transistor T11 is electrically connected to an output terminal OUT2 of the second voltage detection circuit, and a second electrode of the eleventh transistor T11 is electrically connected to the low level supply terminal.

A first terminal of the thirteenth resistor R13 is electrically connected to a first high level supply terminal, and a second terminal of the thirteenth resistor R13 is electrically connected to the output terminal OUT2 of the second voltage detection circuit and the first electrode of the eleventh transistor T11.

As one example, the eleventh transistor T11 may be an N-type transistor. When the input terminal IN2 of the second voltage detection circuit is input with a corresponding timing controller voltage signal, the eleventh transistor T11 is turned on, a low level signal provided by the low level supply terminal is written to the output terminal OUT2 of the second voltage detection circuit through the eleventh transistor T11, and the output terminal OUT2 of the second voltage detection circuit outputs the low level signal. When the input terminal IN2 of the second voltage detection circuit is not input with the corresponding timing controller voltage signal, the eleventh transistor T11 is turned off, a high level signal provided by the first high level supply terminal is written to the output terminal OUT2 of the second voltage detection circuit through the thirteenth resistor R13, and the output terminal OUT2 of the second voltage detection circuit outputs the high level signal.

That is, when the input terminal IN2 of the second voltage detection circuit is input with a corresponding timing controller voltage signal (that is, the second power supply channel is loaded with the corresponding timing controller voltage signal), the output terminal OUT2 of the second voltage detection circuit outputs a low level signal to represent the third operation state information; and when the input terminal IN2 of the second voltage detection circuit is not input with the corresponding timing controller voltage signal (that is, the second power supply channel is not loaded with the corresponding timing controller voltage signal), the output terminal OUT2 of the second voltage detection circuit outputs a high level signal to represent the fourth operation state information.

In the case shown in FIG. 8A, a resistance value r11 of the eleventh resistor R11 and a resistance value r12 of the twelfth resistor R12 satisfy:

$$(V2-VL)*r12/(r11+r12)\geq \text{Vth\_T11\_N},$$

where V2 is a voltage of the timing controller voltage signal, which should be provided by the second power supply channel connected to the second voltage detection circuit, VL is a low level voltage provided by the low level supply terminal, and Vth_T11_N is a threshold voltage of the eleventh transistor T11.

Figure 8B:
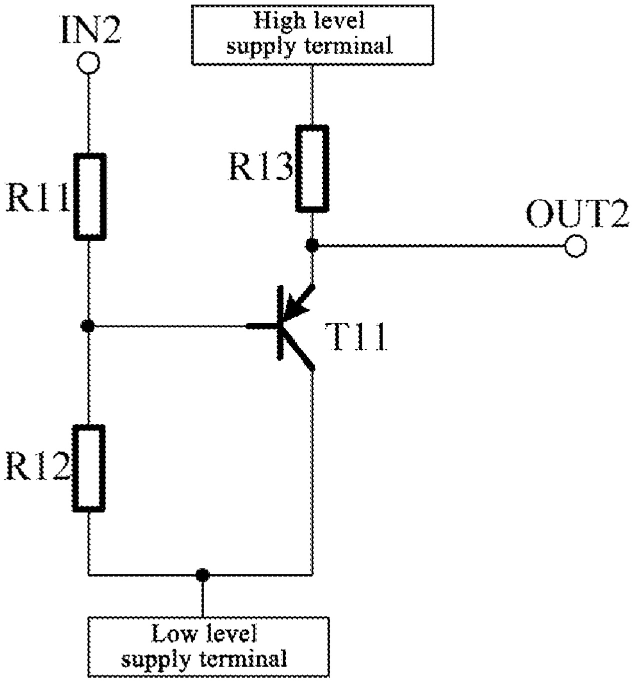
FIG. 8B is a schematic diagram illustrating another circuit structure of the second voltage detection circuit in an embodiment of the present disclosure.

FIG. 8B is schematic diagram illustrating another circuit structure of the second voltage detection circuit in an embodiment of the present disclosure. As shown in FIG. 8B, unlike the case shown in FIG. 8A, the eleventh transistor T11 in the case shown in FIG. 8B is a P-type transistor.

When the input terminal IN2 of the second voltage detection circuit is input with a corresponding timing controller voltage signal, the eleventh transistor T11 is turned off, a high level signal provided by the first high level supply terminal is written to the output terminal OUT2 of the second voltage detection circuit through the thirteenth resistor R13, and the output terminal OUT2 of the second voltage detection circuit outputs the high level signal. When the input terminal IN2 of the second voltage detection circuit is not input with the corresponding timing controller voltage signal, a low level signal provided by the low level supply terminal is written to the gate of the P-type transistor through the twelfth resistor R12, the eleventh transistor T11 is turned on, the low level signal provided by the low level supply terminal is written to the output terminal OUT2 of the second voltage detection circuit through the eleventh transistor T11, and the output terminal OUT2 of the second voltage detection circuit outputs the low level signal.

That is, when the input terminal IN2 of the second voltage detection circuit is input with a corresponding timing controller voltage signal (that is, the second power supply channel is loaded with the corresponding timing controller voltage signal), the output terminal OUT2 of the second voltage detection circuit outputs a high level signal to represent the third operation state information; and when the input terminal IN2 of the second voltage detection circuit is not input with the corresponding timing controller voltage signal (that is, the second power supply channel is not loaded with the corresponding timing controller voltage signal), the output terminal OUT2 of the second voltage detection circuit outputs a low level signal to represent the fourth operation state information.

In the case shown in FIG. 8B, a resistance value r11 of the eleventh resistor R11 and a resistance value r12 of the twelfth resistor R12 satisfy:

$$(V2-VL)*r12/(r11+r12)\geq \text{Vth\_T11\_P},$$

where V2 is a voltage of the timing controller voltage signal, which should be provided by the second power supply channel connected to the second voltage detection circuit, VL is a low level voltage provided by the low level supply terminal, and Vth_T11_P is a threshold voltage of the eleventh transistor T11.

In the cases shown in FIGS. 8A and 8B, VL may specifically be a ground voltage (generally indicated by VSS), which is approximately 0V in magnitude. A resistance value r13 of the thirteenth resistor R13 satisfies r13≥2.5 KΩ, and the thirteenth resistor R13 serves to limit current to prevent an excessive current at the output terminal OUT2 of the second voltage detection circuit.

Figure 8C:
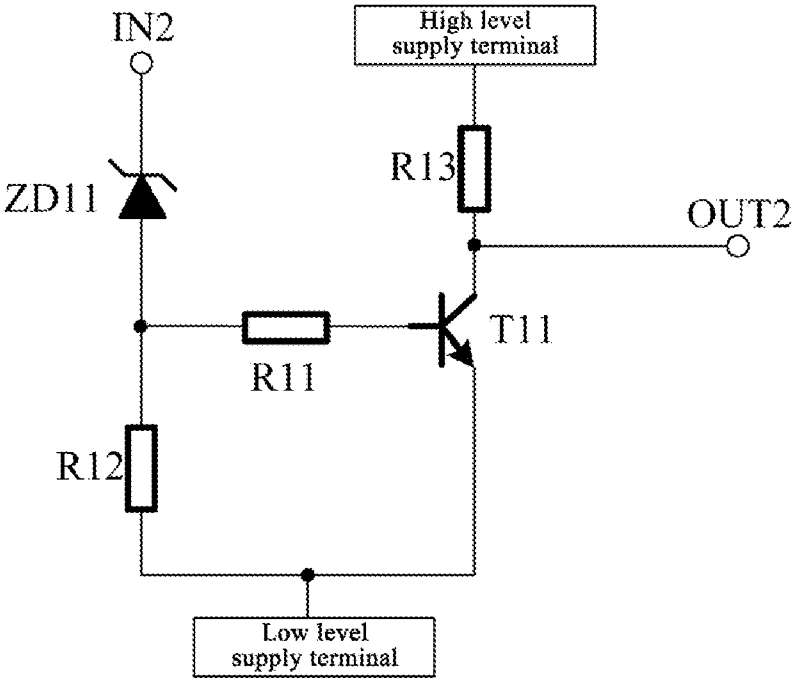
FIG. 8C is a schematic diagram illustrating yet another circuit structure of the second voltage detection circuit in an embodiment of the present disclosure.

FIG. 8C is a schematic diagram illustrating yet another circuit structure of the second voltage detection circuit in an embodiment of the present disclosure. As shown in FIG. 8C, the second detection circuit includes an eleventh resistor R11, a thirteenth resistor R13, an eleventh transistor T11, and an eleventh zener diode ZD11.

A cathode of the eleventh zener diode ZD11 is electrically connected to the input terminal IN2 of the second voltage detection circuit, an anode of the eleventh zener diode ZD11 is electrically connected to a first terminal of the eleventh resistor R11, and a breakdown voltage of the eleventh zener diode ZD11 is less than a voltage of the timing controller voltage signal, which should be provided by the second power supply channel connected to the second voltage detection circuit.

A second terminal of the eleventh resistor R11 is electrically connected to a gate of the eleventh transistor T11.

A first electrode of the eleventh transistor T11 is electrically connected to an output terminal OUT2 of the second voltage detection circuit, a second electrode of the eleventh transistor T11 is electrically connected to a low level supply terminal, and the eleventh transistor T11 is an N-type transistor.

A first terminal of the thirteenth resistor R13 is electrically connected to a first high level supply terminal, and a second terminal of the thirteenth resistor R13 is electrically connected to the output terminal OUT2 of the second voltage detection circuit and the first electrode of the eleventh transistor T11.

In some embodiments, the second voltage detection circuit further includes a twelfth resistor R12. A first terminal of the twelfth resistor R12 is electrically connected to the anode of the eleventh zener diode ZD11 and the first terminal of the eleventh resistor R11, and a second terminal of the twelfth resistor R12 is electrically connected to the low level supply terminal.

The operation principle of the second voltage detection circuit shown in FIG. 8C is similar to that of the second voltage detection circuit shown in FIG. 8A. That is, when the input terminal IN2 of the second voltage detection circuit is input with the corresponding timing controller voltage signal, the output terminal OUT2 of the second voltage detection circuit outputs a low level signal; and when the input terminal IN2 of the second voltage detection circuit is not input with the corresponding timing controller voltage signal, the output terminal OUT2 of the second voltage detection circuit outputs a high level signal.

It should be noted that the second voltage detection circuit may have another circuit structure in an embodiment of the present disclosure, but any detection circuit that can detect whether or not a certain signal is present may be used as the second voltage detection circuit in the present disclosure. Examples will not be listed for description in the present disclosure.

In some embodiments, a power supply transistor (not shown) is disposed in the second power supply channel. A first electrode of the power supply transistor is electrically connected to the display control system component 2, and a second electrode of the power supply transistor is electrically connected to the timing control component 4. The second detection unit 112 is electrically connected to the second electrode of the power supply transistor.

In some embodiments, the second detection unit 112 is integrated in the display control system component 2. Specifically, each electrical device in the second detection unit 112 may be integrated on a circuit board in the display control system component 2 and located at a periphery of a display control system chip, and electrically connected to a part of external terminals of the display control system chip according to actual needs, so that a signal can be transmitted between the second detection unit 112 and the display control system component 2.

Based on the foregoing, it can be seen that, through the second detection unit 112, whether a fault occurs in supplying power by the display control system component 2 to the timing control component 4 can be effectively detected, and the third operation state information for representing that the supplying power by the display control system component 2 to the timing control component 4 is normal, or the fourth operation state information for representing that the supplying power by the display control system component 2 to the timing control component 4 is abnormal can be output, facilitating the operation and maintenance personnel to operate and maintain the display product according to the received “operation state information”, and improving the operation and maintenance efficiency.

Figure 9:
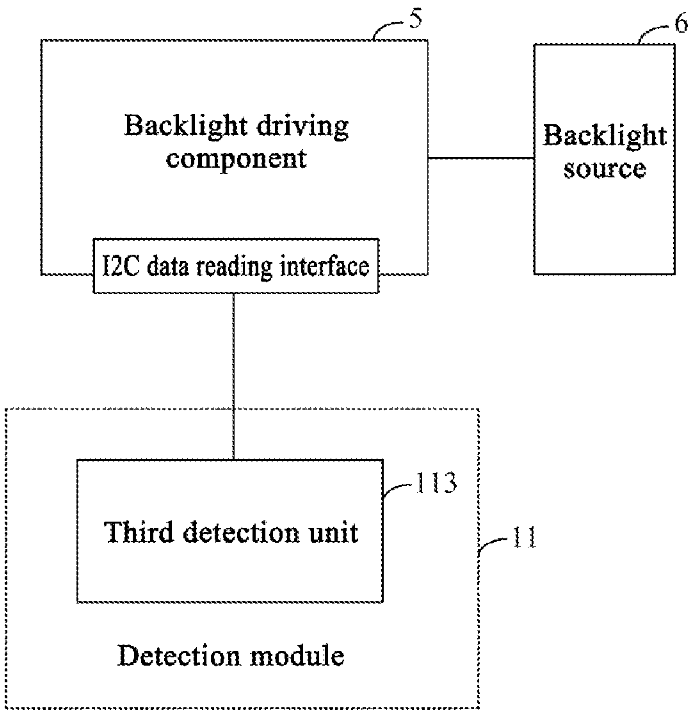
FIG. 9 is a block diagram illustrating yet another structure of the detection module in an embodiment of the present disclosure.

FIG. 9 is a block diagram illustrating yet another structure of the detection module in an embodiment of the present disclosure. As shown in FIG. 9, in some embodiments, the at least one target part includes the backlight driving component 5, a power supply output terminal of the backlight driving component 5 is electrically connected to a first terminal of the backlight source 6, and the backlight driving component 5 is provided with an I2C (Inter-Integrated Circuit) data reading interface. The operation characteristic information of the backlight driving component 5 during operation thereof includes a backlight source voltage signal at the power supply output terminal for supplying power by the backlight driving component 5 to the backlight source 6. The detection module 11 includes a third detection unit 113.

The third detection unit 113 is connected to the I2C data reading interface for the backlight driving component 5, and is configured to output, in response to control of a third detection signal and according to a voltage value of the backlight source voltage signal at the power supply output terminal read by the I2C data reading interface for the backlight driving component 5, fifth operation state information for indicating that supplying power by the backlight driving component 5 to the backlight source 6 is normal, or sixth operation state information for indicating that the supplying power by the backlight driving component 5 to the backlight source 6 is abnormal.

In some embodiments, the third detection unit 113 is specifically configured to output the fifth operation state information when the voltage value of the backlight source voltage signal is within a first preset voltage range, and output the sixth operation state information when the voltage value of the backlight source voltage signal is outside the first preset voltage range.

In some embodiments, the third detection unit 113 is integrated in the display control system component 2. Specifically, the third detection unit 113 is integrated, as software, in the display control system chip of the display control system component 2, and is capable of reading the voltage value of the backlight source voltage signal at the power supply output terminal of the backlight driving component 5 through the I2C data reading interface for the backlight driving component 5.

Figure 10:
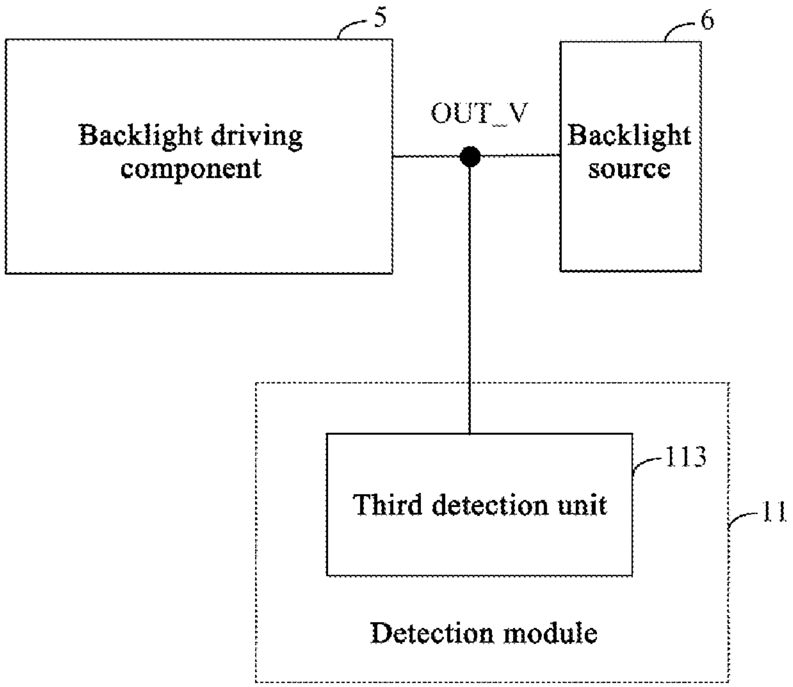
FIG. 10 is a block diagram illustrating yet another structure of the detection module in an embodiment of the present disclosure.

FIG. 10 is a block diagram illustrating yet another structure of the detection module in an embodiment of the present disclosure. As shown in FIG. 10, in some embodiments, the at least one target part includes the backlight driving component 5, and a power supply output terminal OUT_V of the backlight driving component 5 is electrically connected to a first terminal of the backlight source 6. The operation characteristic information of the backlight driving component 5 during operation thereof includes a backlight source voltage signal at the power supply output terminal OUT_V for supplying power by the backlight driving component 5 to the backlight source 6. The detection module 11 includes a third detection unit 113.

The third detection unit 113 is electrically connected to the power supply output terminal OUT_V. and the third detection unit 113 is configured to output, in response to control of a third detection signal and according to a condition of a backlight source voltage signal loaded at the power supply output terminal OUT_V, fifth operation state information indicating that supplying power by the backlight driving component 5 to the backlight source 6 is normal, or sixth operation state information indicating that the supplying power by the backlight driving component 5 to the backlight source 6 is abnormal.

Optionally, when the power supply output terminal OUT_V of the backlight driving component 5 is loaded with a backlight source voltage signal, it indicates that the supplying power by the backlight driving component 5 to the backlight source 6 is normal; and when the power supply output terminal OUT_V of the backlight driving component 5 is not loaded with the backlight source voltage signal, it indicates that the supplying power by the backlight driving component 5 to the backlight source 6 is abnormal.

Figure 11A:
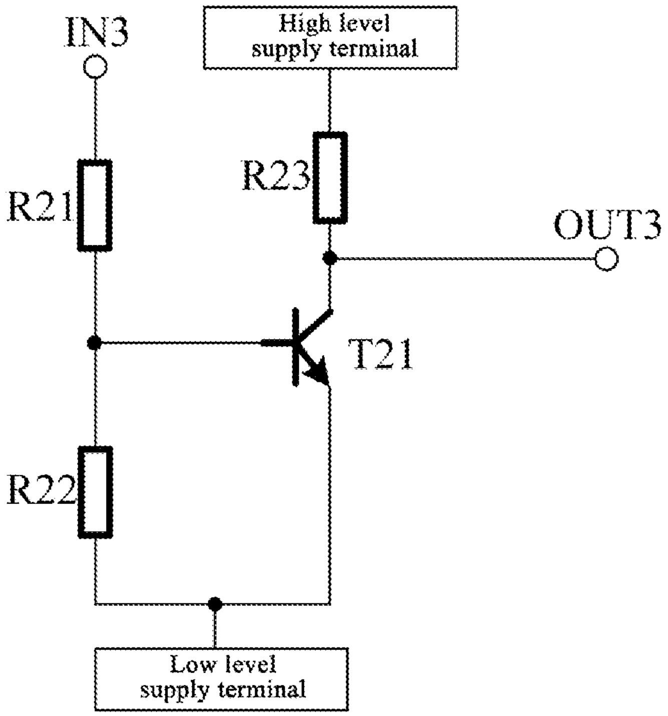
FIG. 11A is a schematic diagram illustrating a circuit structure of a third voltage detection circuit in an embodiment of the present disclosure.

FIG. 11A is a schematic diagram illustrating a circuit structure of a third voltage detection circuit in an embodiment of the present disclosure. As shown in FIG. 11A, in some embodiments, the third detection unit 113 includes a third voltage detection circuit. An input terminal of the third voltage detection circuit is electrically connected to the power supply output terminal OUT_V, and the third voltage detection circuit is configured to output the fifth operation state information when the power supply output terminal OUT_V is loaded with the backlight source voltage signal, and output the sixth operation state information when the power supply output terminal OUT_V is not loaded with the backlight source voltage signal. One of the fifth operation state information and the sixth operation state information is a high level signal, and the other of the fifth operation state information and the sixth operation state information is a low level signal.

In some embodiments, the third voltage detection circuit includes a twenty-first resistor R21, a twenty-second resistor R22, a twenty-third resistor R23, and a twenty-first transistor T21.

A first terminal of the twenty-first resistor R21 is electrically connected to the input terminal IN3 of the third voltage detection circuit, and a second terminal of the twenty-first resistor R21 is electrically connected to a first terminal of the twenty-second resistor R22 and a gate of the twenty-first transistor T21.

The first terminal of the twenty-second resistor R22 is electrically connected to the gate of the twenty-first transistor T21, and a second terminal of the twenty-second resistor R22 is electrically connected to a low level supply terminal.

A first electrode of the twenty-first transistor T21 is electrically connected to an output terminal OUT3 of the third voltage detection circuit, and a second electrode of the twenty-first transistor T21 is electrically connected to the low level supply terminal.

A first terminal of the twenty-third resistor R23 is electrically connected to a second high level supply terminal, and a second terminal of the twenty-third resistor R23 is electrically connected to the output terminal OUT3 of the second voltage detection circuit and the first electrode of the twenty-first transistor T21.

As one example, the twenty-first transistor T21 may be an N-type transistor. When the input terminal IN3 of the third voltage detection circuit is input with a corresponding backlight source voltage signal, the twenty-first transistor T21 is turned on, a low level signal provided by the low level supply terminal is written to the output terminal OUT3 of the third voltage detection circuit through the twenty-first transistor T21, and the output terminal OUT3 of the third voltage detection circuit outputs the low level signal. When the input terminal IN3 of the third voltage detection circuit is not input with the corresponding backlight source voltage signal, the twenty-first transistor T21 is turned off, a high level signal provided by the second high level supply terminal is written to the output terminal OUT3 of the third voltage detection circuit through the twenty-third resistor R23, and the output terminal OUT3 of the third voltage detection circuit outputs the high level signal.

That is, when the input terminal of the third voltage detection circuit is input with a corresponding backlight source voltage signal (that is, the power supply output terminal OUT_V of the backlight driving component 5 is loaded with the corresponding backlight source voltage signal), the output terminal OUT3 of the third voltage detection circuit outputs a low level signal to represent the fifth operation state information; and when the input terminal IN3 of the third voltage detection circuit is not input with the corresponding backlight source voltage signal (that is, the power supply output terminal OUT_V of the backlight driving component 5 is not loaded with the corresponding backlight source voltage signal), the output terminal OUT3 of the third voltage detection circuit outputs a high level signal to represent the sixth operation state information.

In the case shown in FIG. 11A, a resistance value r21 of the twenty-first resistor R21 and a resistance value r22 of the twenty-second resistor R22 satisfy:

$$(V3-VL)*r22/(r21+r22)\geq \mathrm{Vth\_T21\_N},$$

where V3 is a voltage of the backlight source voltage signal, which should be provided by the power output terminal OUT_V of the backlight driving component 5 connected to the third voltage detection circuit, VL is a low level voltage provided by the low level supply terminal, and Vth_T21_N is a threshold voltage of the twenty-first transistor T21.

Figure 11B:
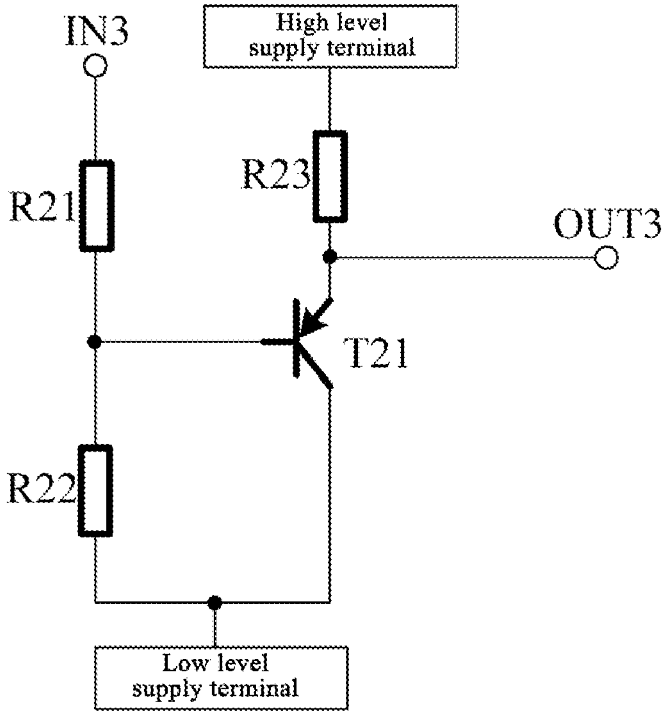
FIG. 11B is a schematic diagram illustrating another circuit structure of the third voltage detection circuit in an embodiment of the present disclosure.

FIG. 11B is a schematic diagram illustrating another circuit structure of the third voltage detection circuit in an embodiment of the present disclosure. As shown in FIG. 11B, unlike the case shown in FIG. 11A, the twenty-first transistor T21 in the case shown in FIG. 11B is a P-type transistor.

When the input terminal IN3 of the third voltage detection circuit is input with a corresponding backlight source voltage signal, the twenty-first transistor T21 is turned off, a high level signal provided by the second high level supply terminal is written to the output terminal OUT3 of the third voltage detection circuit through the twenty-third resistor R23, and the output terminal OUT3 of the third voltage detection circuit outputs the high level signal. When the input terminal IN3 of the third voltage detection circuit is not input with the corresponding backlight source voltage signal, a low level signal provided by the low level supply terminal is written to the gate of the P-type transistor through the twenty-second resistor R22, the twenty-first transistor T21 is turned on, the low level signal provided by the low level supply terminal is written to the output terminal OUT3 of the third voltage detection circuit through the twenty-first transistor T21, and the output terminal OUT3 of the third voltage detection circuit outputs the low level signal.

That is, when the input terminal IN3 of the third voltage detection circuit is input with a corresponding backlight source voltage signal (that is, the power supply output terminal OUT_V of the backlight driving component 5 is loaded with the corresponding backlight source voltage signal), the output terminal OUT3 of the third voltage detection circuit outputs a high level signal to represent the fifth operation state information; and when the input terminal IN3 of the third voltage detection circuit is not input with the corresponding backlight source voltage signal (that is, the power supply output terminal OUT_V of the backlight driving component 5 is not loaded with the corresponding backlight source voltage signal), the output terminal OUT3 of the third voltage detection circuit outputs a low level signal to represent the sixth operation state information.

In the case shown in FIG. 11B, a resistance value r21 of the twenty-first resistor R21 and a resistance value r22 of the twenty-second resistor R22 satisfy:

$$(V3-VL)*r22/(r21+r22)\geq \mathrm{Vth\_T21\_P},$$

where V3 is a voltage of the backlight source voltage signal, which should be provided by the power supply output terminal OUT_V connected to the third voltage detection circuit, VL is a low level voltage provided by the low level supply terminal, and Vth_T21_P is a threshold voltage of the twenty-first transistor T21.

In the cases shown in FIGS. 11A and 11B, VL may specifically be a ground voltage (generally referred to as VSS), which is approximately 0V in magnitude. The resistance value r23 of the twenty-third resistor R23 satisfies r23≥2.5 KΩ, and the twenty-third resistor R23 serves to limit current to prevent an excessive current at the output terminal OUT3 of the third voltage detection circuit.

Figure 11C:
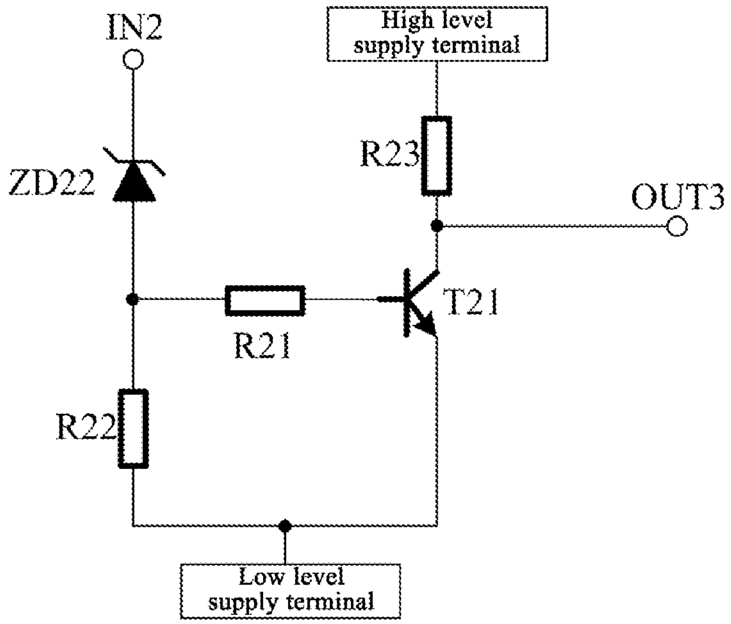
FIG. 11C is a schematic diagram illustrating yet another circuit structure of the third voltage detection circuit in an embodiment of the present disclosure.

FIG. 11C is a schematic diagram illustrating yet another circuit structure of the third voltage detection circuit in an embodiment of the present disclosure. As shown in FIG. 11C, the third detection circuit includes a twenty-first resistor R21, a twenty-third resistor R23, a twenty-first transistor T21, and a twenty-second zener diode ZD22.

A cathode of the twenty-second zener diode ZD22 is electrically connected to an input terminal IN3 of the third voltage detection circuit, an anode of the twenty-second zener diode ZD22 is electrically connected to a first terminal of the twenty-first resistor R21, and a breakdown voltage of the twenty-second zener diode ZD22 is less than a voltage of the backlight source voltage signal, which should be provided by the power supply output terminal OUT_V of the backlight driving component 5 connected to the third voltage detection circuit.

A second terminal of the twenty-first resistor R21 is electrically connected to a gate of the twenty-first transistor T21.

A first electrode of the twenty-first transistor T21 is electrically connected to an output terminal OUT3 of the third voltage detection circuit, a second electrode of the twenty-first transistor T21 is electrically connected to a low level supply terminal, and the twenty-first transistor T21 is an N-type transistor.

A first terminal of the twenty-third resistor R23 is electrically connected to a second high level supply terminal, and a second terminal of the twenty-third resistor R23 is electrically connected to the output terminal OUT3 of the third voltage detection circuit and the first electrode of the twenty-first transistor T21.

In some embodiments, the third voltage detection circuit further includes a twenty-second resistor R22. A first terminal of the twenty-second resistor R22 is electrically connected to the anode of the twenty-second zener diode ZD22 and the first terminal of the twenty-first resistor R21, and a second terminal of the twenty-second resistor R22 is electrically connected to the low level supply terminal.

The operation principle of the third voltage detection circuit shown in FIG. 11C is similar to that of the third voltage detection circuit shown in FIG. 11A. That is, when the input terminal IN3 of the third voltage detection circuit is input with the corresponding backlight source voltage signal, the output terminal OUT3 of the third voltage detection circuit outputs a low level signal; and when the input terminal IN3 of the third voltage detection circuit is not input with the backlight source voltage signal, the output terminal OUT3 of the third voltage detection circuit outputs a high level signal.

It should be noted that the third voltage detection circuit may have another circuit structure in an embodiment of the present disclosure, but any detection circuit that can detect whether or not a certain signal is present may be used as the third voltage detection circuit in the present disclosure. Examples will not be listed for description in the present disclosure.

In some embodiments, the third detection unit 113 is integrated in the backlight driving component 5. Specifically, the backlight driving component 5 includes a circuit board fixed with various electrical devices for implementing the backlight driving function, and each electrical device in the third detection unit 113 may be integrated on the circuit board in the backlight driving component 5, and electrically connected to a part of external terminals existing in the backlight driving component 5 according to actual needs, so that a signal can be transmitted between the third detection unit 113 and the backlight driving component 5. In addition, the output terminal of the third detection unit 113 is further connected to the display control system component 2, so that a signal can be transmitted between the third detection unit 113 and the display control system component 2 (for example, the fifth operation state information/sixth operation state information is transmitted to the display control system component 2).

Based on the foregoing, it can be seen that, through the third detection unit 113, whether a fault occurs in supplying power by the backlight driving component 5 to the backlight source 6 can be effectively detected, and the fifth operation state information for representing that the supplying power by the backlight driving component 5 to the backlight source 6 is normal, or the sixth operation state information for representing that the supplying power by the backlight driving component 5 to the backlight source 6 is abnormal can be output, facilitating the operation and maintenance personnel to operate and maintain the display product according to the received "operation state information", and improving the operation and maintenance efficiency.

Figure 12:
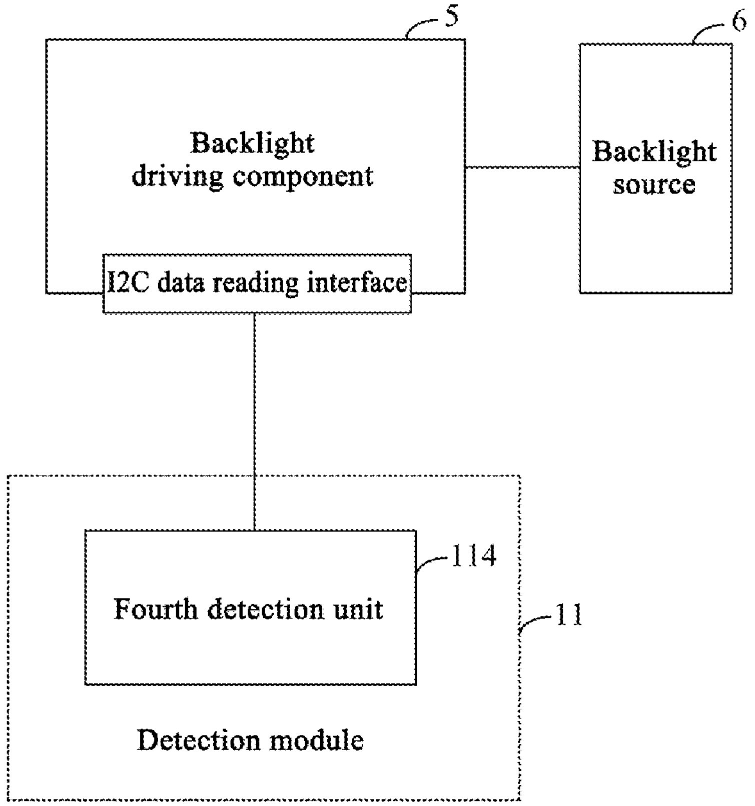
FIG. 12 is a block diagram illustrating still another structure of the detection module in an embodiment of the present disclosure.

FIG. 12 is a block diagram illustrating still another structure of the detection module in an embodiment of the present disclosure. As shown in FIG. 12, in some embodiments, the at least one target part includes the backlight source 6, and a power supply output terminal OUT_V of the backlight driving component 5 is electrically connected to a first terminal of the backlight source 6. The operation characteristic information of the backlight source 6 during operation thereof includes an operating current signal of the backlight source 6 during operation of the backlight source 6. The detection module 11 includes a fourth detection unit 114.

The fourth detection unit 114 is configured to output, in response to control of a fourth detection signal and according to the operating current signal of the backlight source 6 during operation of the backlight source 6, seventh operation state information indicating that the operating current of the backlight source 6 is normal, or eighth operation state information indicating that the operating current of the backlight source 6 is abnormal.

Optionally, the fourth detection unit 114 is specifically configured to output the seventh operation state information when a current value of the operating current signal of the backlight source 6 is within a first preset current range, and output the eighth operation state information when the current value of the operating current signal of the backlight source 6 is outside the first preset current range.

In some embodiments, the backlight driving component 5 is provided with an I2C data reading interface. The fourth detection unit 114 is connected to the I2C data reading interface of the backlight driving component 5, and the fourth detection unit 114 is further configured to read, in response to the control of the fourth detection signal, the current value of the operating current signal of the backlight source 6 through the I2C data reading interface of the backlight driving component 5.

In some embodiments, the fourth detection unit 114 is integrated in the display control system component 2. Specifically, the fourth detection unit 114 is integrated, as software, in the display control system chip in the display control system component 2, and is capable of reading the current value of the operating current signal of the backlight source 6 (that is, the current value at the power supply output terminal OUT_V where the backlight driving component 5 supplies power to the backlight source 6) through the I2C data reading interface for the backlight driving component 5.

Figure 13:
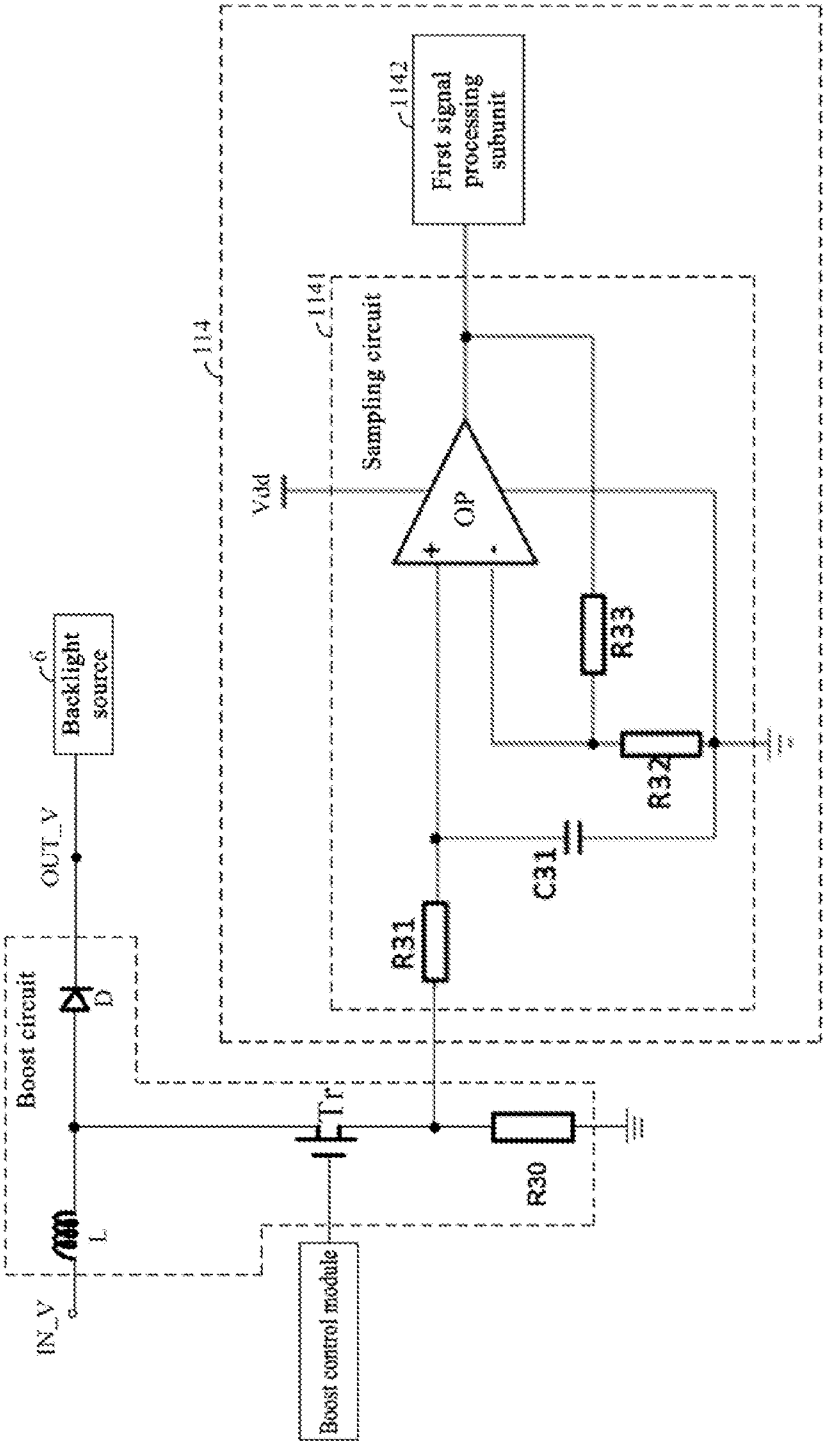
FIG. 13 is a block diagram illustrating still another structure of the detection module in an embodiment of the present disclosure.

FIG. 13 is a block diagram illustrating still another structure of the detection module in an embodiment of the present disclosure. As shown in FIG. 13, in contrast to the manner of directly reading the current value of the operating current signal of the backlight source 6 through the I2C data reading interface, the operating current signal of the backlight source 6 during the operation of the backlight source 6 may be acquired based on a sampling circuit in some embodiments. In some embodiments, the fourth detection unit 114 includes a sampling circuit 1141 and a first signal processing subunit 1142.

An input terminal of the sampling circuit 1141 is electrically connected to the backlight source 6, the sampling circuit 1141 is connected in series to the backlight source 6, and the sampling circuit 1141 is configured to acquire an analog sampling voltage signal corresponding to the operating current signal of the backlight source 6. The first signal processing subunit 1142 is configured to perform an analog-to-digital conversion on the analog sampling voltage signal to obtain a corresponding digital sampling voltage signal, and detect, according to a voltage value of the digital sampling voltage signal, whether a current value of the operating current signal of the backlight source 6 is within a first preset current range.

If the voltage value of the digital sampling voltage signal is within a second preset voltage range, it indicates that, the first signal processing subunit 1142 detects that the current value of the operating current signal of the backlight source 6 is within the first preset current range, and the seventh operation state information is output. If the voltage value of the digital sampling voltage signal is outside the second preset voltage range, it indicates that, the first signal processing subunit 1142 detects that the current value of the operating current signal of the backlight source 6 is outside the first preset current range, and the eighth operation state information is output.

In some embodiments, the backlight driving component 5 includes a boost circuit and a boost control module. An output terminal of the boost circuit is a power supply output terminal OUT_V of the backlight driving component 5 for providing the backlight source voltage signal to the backlight source 6, and the boost circuit serves to generate and output the backlight source voltage signal.

The boost circuit includes an inductor L, a boost control transistor Tr, a rectifier diode D, and a thirtieth resistor R30. A first terminal of the inductor L is electrically connected to an input terminal IN_V of the boost circuit, and a second terminal of the inductor L is electrically connected to an anode of the rectifier diode D. A gate of the boost control transistor Tr is electrically connected to the boost control module, a first electrode of the boost control transistor Tr is electrically connected to the anode of the rectifier diode D. and a second electrode of the boost control transistor Tr is electrically connected to a first terminal of the thirtieth resistor R30. A second terminal of the thirtieth resistor R30 is grounded. A cathode of the rectifier diode D is electrically connected to the power supply output terminal OUT_V of the backlight driving component 5. An input terminal of the sampling circuit 1141 is electrically connected to the first terminal of the thirtieth resistor R30.

In practical applications, the boost control transistor Tr is controlled to be turned on or off by a signal output by the boost control module, so that a voltage of the backlight source voltage signal output by the boost circuit can be controlled.

In an embodiment of the present disclosure, the thirtieth resistor R30 in the boost circuit also serves as a sampling resistor. That is, a detection of the operating current signal of the backlight source 6 is converted into a detection of a voltage signal at the first terminal of the thirtieth resistor R30. Under the condition that a resistance value of the thirtieth resistor R30 is fixed, a magnitude of the voltage at the first terminal of the thirtieth resistor R30 is proportional to the operating current signal of the backlight source 6.

In some embodiments, the sampling circuit 1141 includes a thirty-first resistor R31, a thirty-second resistor R32, a thirty-third resistor R33, and an operational amplifier OP. A first terminal of the thirty-first resistor R31 is electrically connected to the input terminal of the sampling circuit 1141, and a second terminal of the thirty-first resistor R31 is electrically connected to a non-inverting input terminal of the operational amplifier OP. A first terminal of the thirty-second resistor R32 is electrically connected to an inverting input terminal of the operational amplifier OP, and a second terminal of the thirty-second resistor R32 is grounded. A first terminal of the thirty-third resistor R33 is electrically connected to the inverting input terminal of the operational amplifier OP, and a second terminal of the thirty-third resistor R33 is electrically connected to an output terminal of the operational amplifier OP. The output terminal of the operational amplifier OP is electrically connected to an output terminal of the sampling circuit 1141.

In an embodiment of the present disclosure, the sampling circuit 1141 may sample and amplify the voltage signal at the first terminal of the thirty-third resistor R30, where a specific amplification factor is determined by a ratio of a resistance value of the thirty-third resistor R33 to a resistance value of the thirty-second resistor R32.

In some embodiments, the sampling circuit 1141 further includes an anti-interference capacitor C31. A first terminal of the anti-interference capacitor C31 is electrically connected to the non-inverting input terminal, and a second terminal of the anti-interference capacitor C31 is grounded. A capacitance value of the anti-interference capacitor C31 is in a range of 330 P to 2200 P.

It should be noted that, in an embodiment of the present disclosure, a special sampling resistor (the thirtieth resistor R30 does not serve as a sampling resistor) may alternatively be disposed in the sampling circuit 1141, and the analog sampling voltage signal corresponding to the operating current signal of the backlight source 6 is obtained by detecting a voltage signal formed by the operating current signal of the backlight source 6 flowing through the sampling resistor. Such a case should also fall within the protection scope of the present disclosure.

In some embodiments, the sampling circuit 1141 is integrated in the backlight driving component 5. Specifically, the backlight driving component 5 includes a circuit board fixed with various electrical devices for implementing the backlight driving function, and each electrical device in the sampling circuit 1141 may be integrated on the circuit board of the backlight driving component 5. That is, the electrical devices in the sampling circuit and the electrical devices in the voltage boost circuit are fixed on the same circuit board.

The first signal processing subunit 1142 is integrated in the display control system component 2. Specifically, the first signal processing subunit 1142 is integrated, as software, in a display control system chip in the display control system component 2.

Based on the foregoing, it can be seen that, through the fourth detection unit 114, whether a fault occurs in the operating current signal of the backlight source 6 during operation of the backlight source 6 can be effectively detected (for example, when the operating current of the backlight source 6 is too large, it indicates that a problem of short circuit in a lamp strip exists in the backlight source 6, and when the operating current of the backlight source 6 is too small, it indicates that a problem of open circuit in a lamp strip exists in the backlight source 6), and the seventh operation state information for representing that the operating current of the backlight source 6 is normal, or the eighth operation state information for indicating that the operating current of the backlight source 6 is abnormal can be output, facilitating the operation and maintenance personnel to operate and maintain the display product according to the received "operation state information", and improving the operation and maintenance efficiency.

Figure 14:
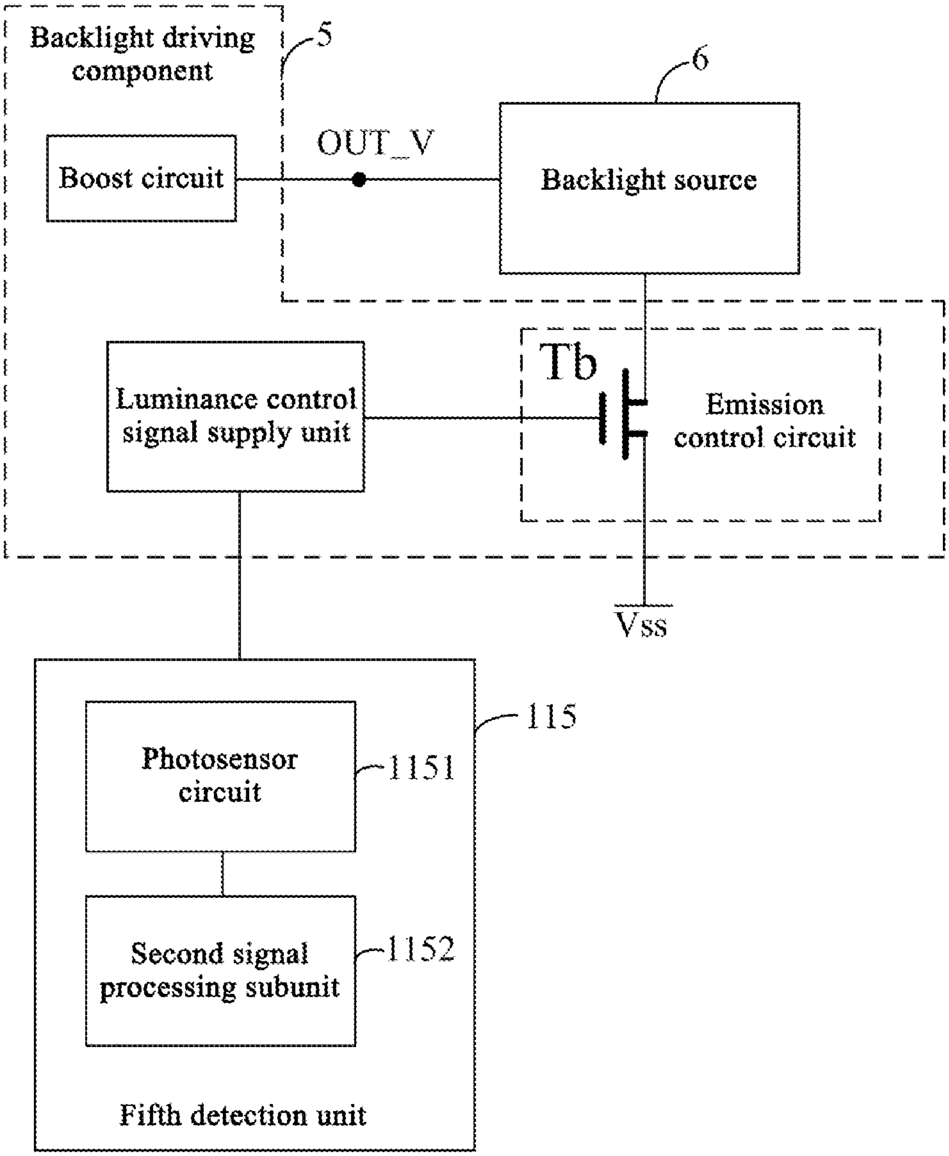
FIG. 14 is a block diagram illustrating still another structure of the detection module in an embodiment of the present disclosure.

FIG. 14 is a block diagram illustrating still another structure of the detection module in an embodiment of the present disclosure. As shown in FIG. 14, in some embodiments, the at least one target part includes the backlight source 6. The operation characteristic information of the backlight source 6 during operation thereof includes a current emission luminance of the backlight source 6 during operation thereof. The detection module 11 includes a fifth detection unit 115.

The fifth detection unit 115 is configured to output, in response to control of a fifth detection signal and according to the current emission luminance of the backlight source 6 during operation thereof, ninth operation state information for indicating that emission of the backlight source 6 is normal, or tenth operation state information for indicating that the emission of the backlight source 6 is abnormal.

Optionally, the backlight driving component 5 includes an emission control circuit (generally including an emission control transistor Tb). A second terminal of the backlight source 6 is electrically connected to a second operating voltage terminal (generally supplied with a Vss voltage) through the emission control circuit. The emission control circuit is configured to be controlled by an emission luminance control signal, so that a conductive path is formed between the second terminal of the backlight source 6 and the second operating voltage terminal when the emission luminance control signal is in an active level state, and an open circuit is formed between the second terminal of the backlight source 6 and the second operating voltage terminal when the emission luminance control signal is in a non-active level state.

In an embodiment of the present disclosure, a lighting time of the backlight source 6 per unit time can be controlled by the emission control circuit, so that an equivalent emission luminance of the backlight source 6 per unit time can be controlled. The shorter the lighting time of the backlight source 6 per unit time is, the darker the equivalent emission luminance of the backlight source 6 is.

In some embodiments, the fifth detection unit 115 includes a photosensor circuit 1151 and a second signal processing subunit 1152. The photosensor circuit 1151 is configured to acquire light emitted by the backlight source 6 during operation thereof and output a corresponding photosensitive electrical signal. The second signal processing subunit 1152 is configured to determine, according to the photosensitive electrical signal output by the photosensor, the current emission luminance of the backlight source 6 during operation thereof, and detect, according to the current emission luminance and a duty ratio of the emission luminance control signal currently received by the emission control circuit, whether the emission of the backlight source 6 is normal or abnormal.

Figure 15:
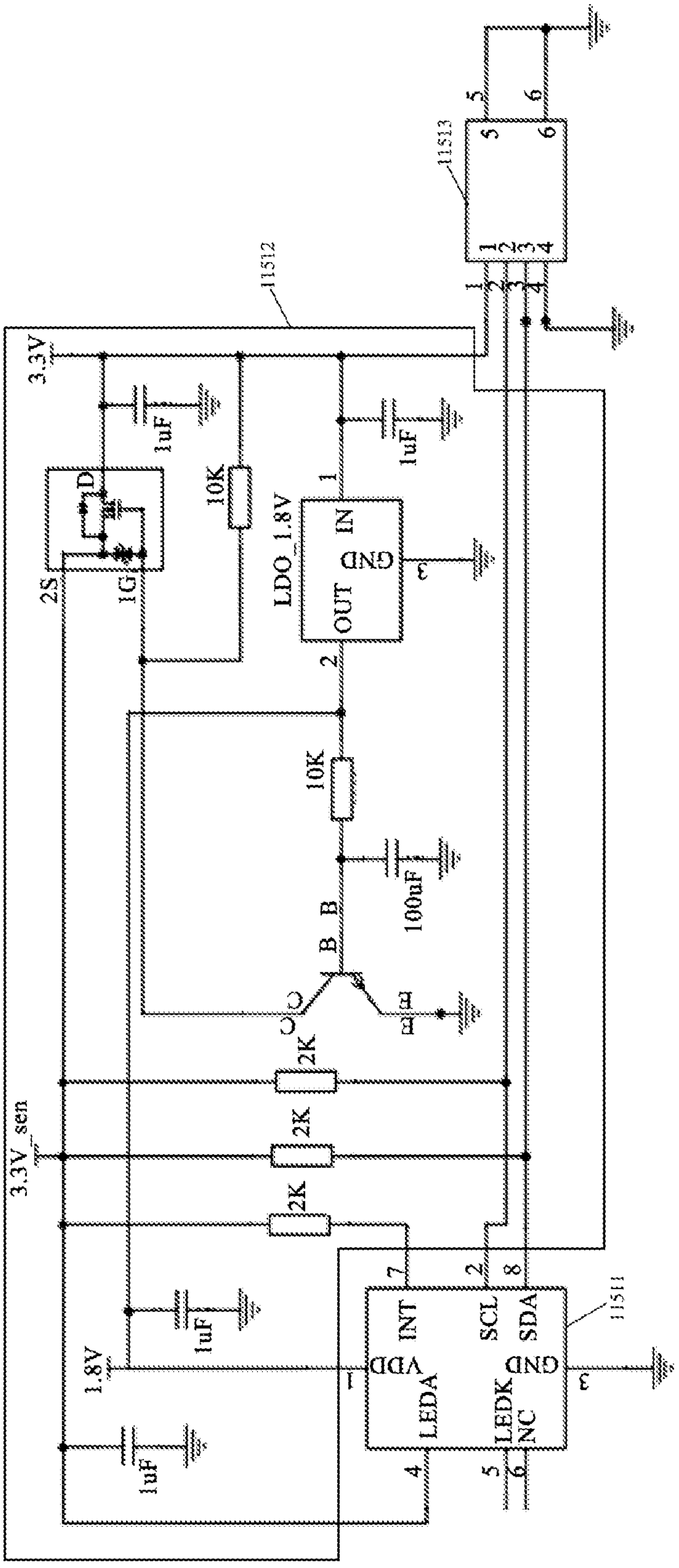
FIG. 15 is a schematic diagram illustrating a circuit structure of a photosensor circuit in an embodiment of the present disclosure.
Figure 16:
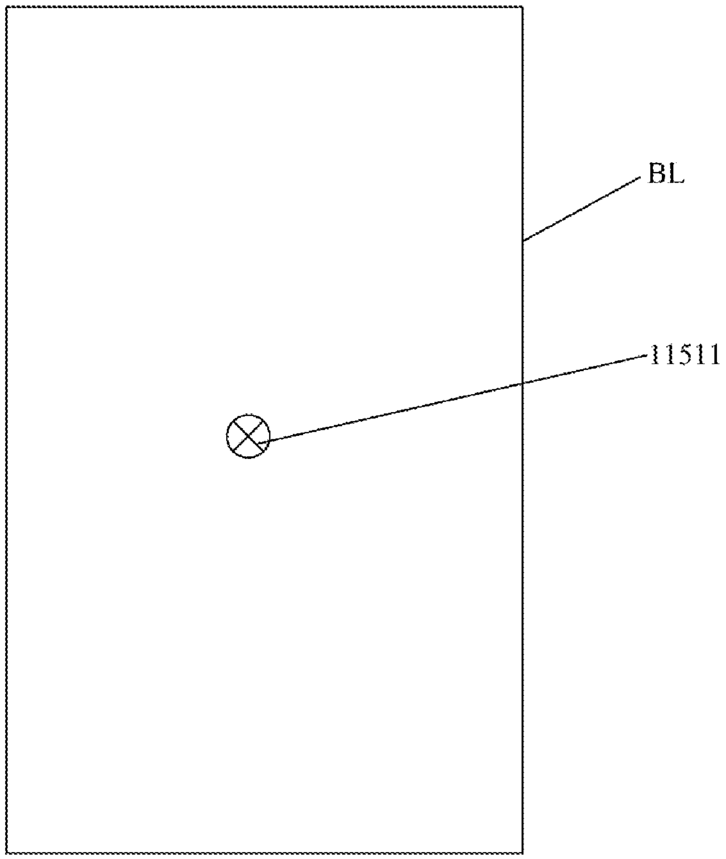
FIG. 16 is a schematic diagram illustrating a photosensor chip disposed on a back plate in an embodiment of the present disclosure.

FIG. 15 is a schematic diagram illustrating a circuit structure of a photosensor circuit in an embodiment of the present disclosure. FIG. 16 is a schematic diagram of a photosensor chip disposed on a back plate in an embodiment of the present disclosure. As shown in FIGS. 15 and 16, the photosensor circuit 1151 includes a photosensor chip 11511, a power supply circuit 11512, and an output module 11513.

The power supply circuit 11512 is configured to provide required various operating voltages to the photosensor 11511. The photosensor 11511 serves to acquire light, generate a corresponding photosensitive electrical signal and transmit the corresponding photosensitive electrical signal to the output module 11513. The output module 11513 serves to output the photosensitive electrical signal. Data transmission may be performed between the photosensor 11511 and the output module 11513 through an SCL\SDA signal line (i.e., Serial Clock Line\Serial Data Line).

It should be noted that the specific circuit structure of the power supply circuit 11512 shown in the drawings is only an alternative implementation in the present disclosure, which does not limit the technical solution of the present disclosure. In an embodiment of the present disclosure, the specific circuit structure of the power supply circuit 11512 may be designed and adjusted according to the selected photosensor 11511.

In some embodiments, the output module 11513 is connected to an I2C bus interface of the display control system component 2, so that the photosensitive electrical signal can be transmitted to the display control system component 2.

In practical applications, the backlight source 6 is generally disposed on a front surface of the back plate BL, and other optical structures, such as a light guide plate and optical films (e.g., a prism film, a diffuser sheet, or the like) are disposed on the front surface of the back plate BL. In an embodiment of the present disclosure, a via penetrating through the back plate BL may be formed in the back plate BL, and then the photosensor 11511 is disposed in the via, so that the photosensor can acquire light emitted by the backlight source 6.

Figure 17A:
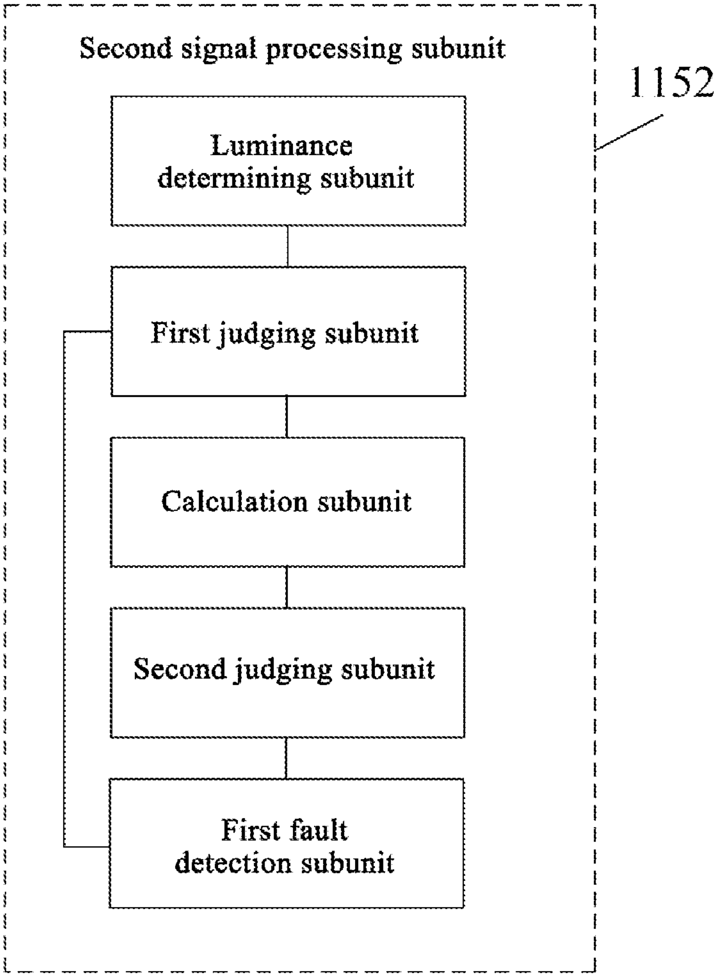
FIG. 17A is a block diagram illustrating a structure of a second signal processing subunit in an embodiment of the present disclosure.
Figure 17B:
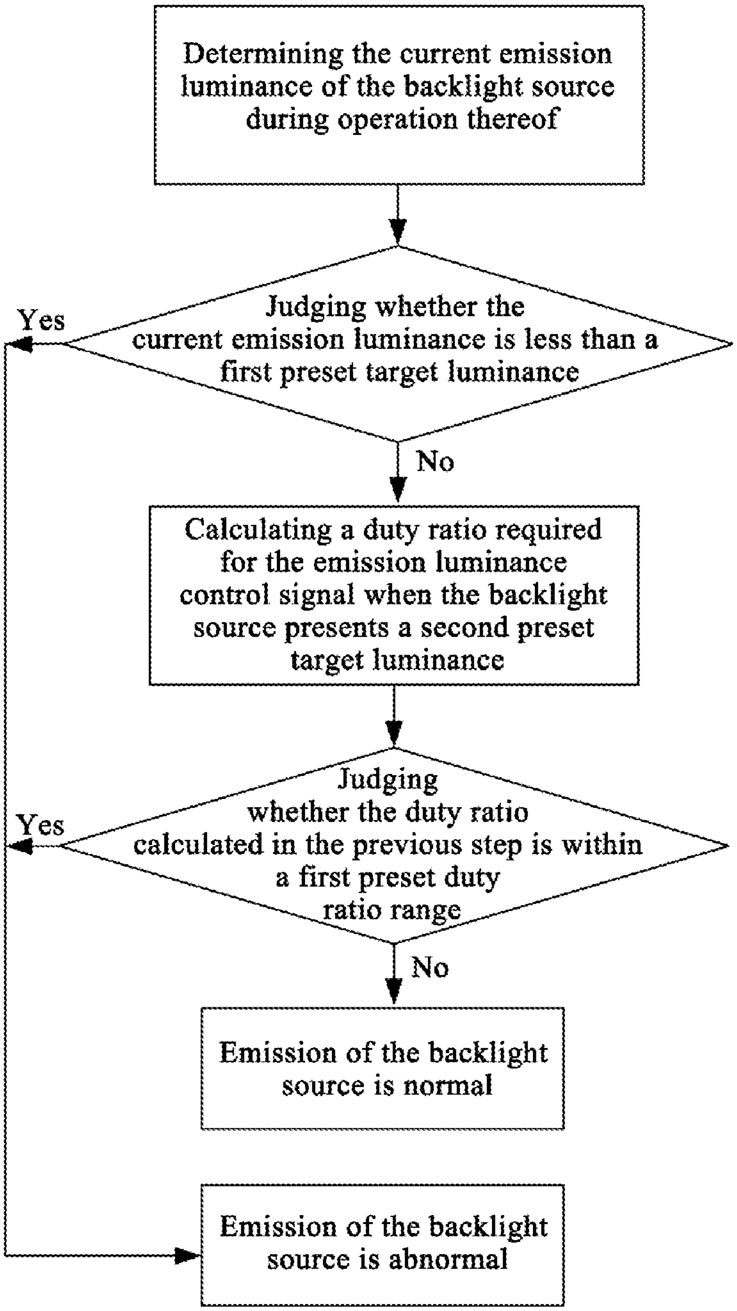
FIG. 17B is a flowchart illustrating processing logic for operation of the second signal processing subunit shown in FIG. 17A.

FIG. 17A is a block diagram illustrating a structure of a second signal processing subunit in an embodiment of the present disclosure. FIG. 17B is a flowchart illustrating processing logic for operation of the second signal processing subunit shown in FIG. 17A. As shown in FIGS. 17A and 17B, in some embodiments, the second signal processing subunit 1152 includes a luminance determining subunit, a first judging subunit, a calculation subunit, a second judging subunit, and a first fault detection subunit.

The luminance determining subunit is configured to determine, according to the photosensitive electrical signal, the current emission luminance of the backlight source 6 during operation of the backlight source 6.

The first judging subunit is configured to judge whether the current emission luminance is less than a first preset target luminance.

The calculation subunit is configured to, when the first judging subunit judges that the current emission luminance is less than the first preset target luminance, calculate, according to the current emission luminance and a duty ratio of the emission luminance control signal currently received by the emission control circuit, a duty ratio required for the emission luminance control signal when the backlight source 6 presents a second preset target luminance, where the second preset target luminance is greater than or equal to the first preset target luminance.

The second judging subunit is configured to judge whether the duty ratio required for the emission luminance control signal when the backlight source 6 presents the second preset target luminance is within a first preset duty ratio range.

The first fault detection subunit is configured to detect that the emission of the backlight source 6 is normal when the second judging subunit judges that the duty ratio required for the emission luminance control signal when the backlight source 6 presents the second preset target luminance is within the first preset duty ratio range; detect that the emission of the backlight source 6 is abnormal when the second judging subunit judges that the duty ratio required for the emission luminance control signal when the backlight source 6 presents the second preset target luminance is outside the first preset duty ratio range; and detect that the emission of the backlight source 6 is normal when the first judging subunit judges that the current emission luminance is greater than or equal to the first preset target luminance.

The duty ratio of the emission luminance control signal is a ratio of a duration of the emission luminance control signal in an active level state in a unit period to a duration of the unit period. A larger duty ratio indicates a longer lighting time of the backlight source 6 in the unit period.

In the solutions shown in FIGS. 17A and 17B, whether the current emission luminance of the backlight source 6 is abnormal or not may be judged according to the current emission luminance of the backlight source 6 and the first preset target luminance, and when it is judged that the current emission luminance of the backlight source 6 is abnormal, the duty ratio required for the emission luminance control signal when the backlight source 6 presents the second preset target luminance is calculated according to the current emission luminance of the backlight source 6 and the current duty ratio of the emission luminance control signal. If the calculated duty ratio required for the emission luminance control signal when the backlight source 6 presents the second preset target luminance is within the first preset duty ratio range (including end points, for example, the first preset duty ratio range is 0 to 100%, or the first preset duty ratio range is 10% to 90%), it indicates that the emission of the backlight source 6 is normal. If the calculated duty ratio required for the emission luminance control signal when the backlight source 6 presents the second preset target luminance is outside the first preset duty ratio range, it indicates that the emission of the backlight source 6 is abnormal.

Figure 18A:
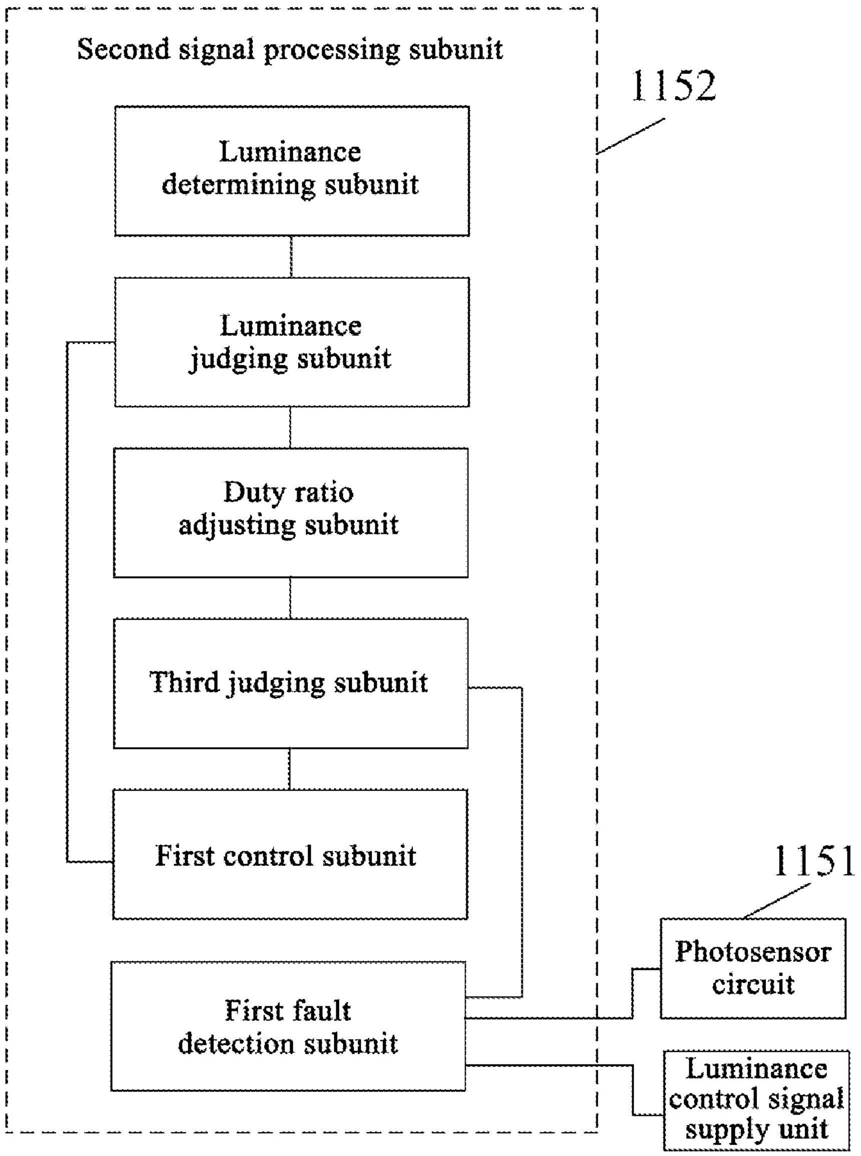
FIG. 18A is a block diagram illustrating a structure of a second signal processing subunit in an embodiment of the present disclosure.
Figure 18B:
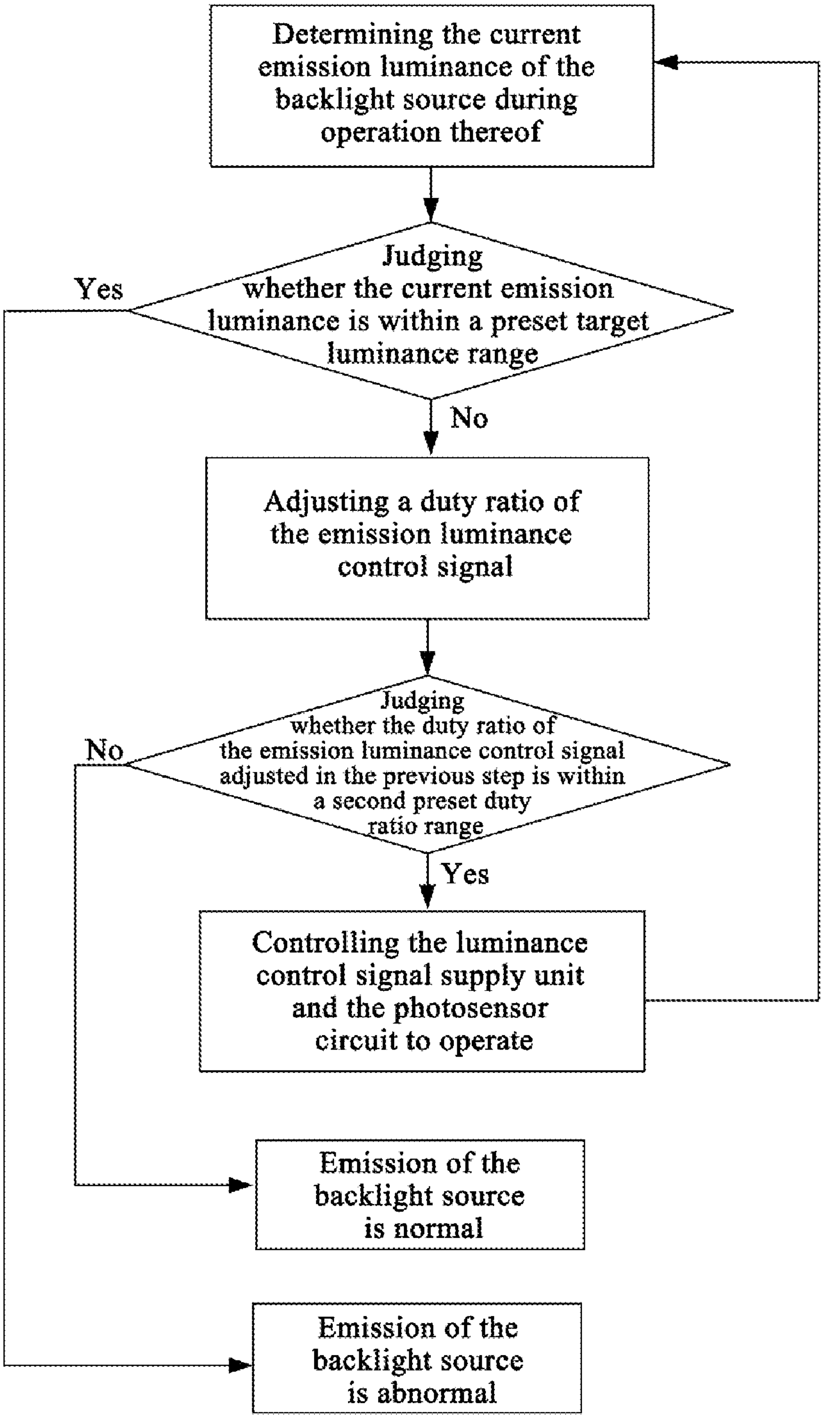
FIG. 18B is a flowchart illustrating processing logic for operation of the second signal processing subunit shown in FIG. 18A.

FIG. 18A is a block diagram illustrating a structure of a second signal processing subunit in an embodiment of the present disclosure. FIG. 18B is a flow chart of processing logic for operation of the second signal processing subunit 1152 shown in FIG. 18A. As shown in FIGS. 18A and 18B, as another alternative embodiment of the second signal processing subunit 1152, the backlight driving component 5 further includes a luminance control signal supply unit. The luminance control signal supply unit is electrically connected to the emission control circuit, and is configured to provide an emission luminance control signal to the emission control circuit.

The second signal processing subunit 1152 includes a luminance determining subunit, a luminance judging subunit, a duty ratio adjusting subunit, a third judging subunit, a first control subunit, and a first fault detection subunit.

The luminance determining subunit is configured to determine, according to the photosensitive electrical signal, the current emission luminance of the backlight source 6 during operation of the backlight source 6.

The luminance judging subunit is configured to judge whether the current emission luminance is within a preset target luminance range.

The duty ratio adjusting subunit is configured to increase, when the luminance judging subunit judges that the current emission luminance is less than a minimum value of the preset target luminance range, a duty ratio of the emission luminance control signal according to a first preset adjustment algorithm (for example, increase the duty ratio of the emission luminance control signal in a step-wise increase manner); and to reduce, when the luminance judging subunit judges that the current emission luminance is greater than a maximum value of the preset target luminance range, the duty ratio of the emission luminance control signal according to a second preset adjustment algorithm (for example, reduce the duty ratio of the emission luminance control signal in a step-wise reduction manner).

The third judging subunit is configured to judge whether the duty ratio of the emission luminance control signal which has been adjusted by the duty ratio adjusting subunit is within a second preset duty ratio range.

The first control subunit is configured to, when the third judging subunit judges that the duty ratio of the emission luminance control signal which has been adjusted by the duty ratio adjusting subunit is within the second preset duty ratio range, control the luminance control signal supply unit to output the emission luminance control signal with the duty ratio which has been adjusted by the duty ratio adjusting subunit to the emission control circuit, and control the photosensor circuit 1151 to acquire again light emitted by the backlight source 6 during operation of the backlight source 6.

The first fault detection subunit is configured to detect that the emission of the backlight source 6 is abnormal when the third judging subunit judges that the duty ratio of the emission luminance control signal which has been adjusted by the duty ratio adjusting subunit is outside the second preset duty ratio range; and detect that the emission of the backlight source 6 is normal when the luminance judging subunit judges that the current emission luminance is within the preset target luminance range.

In the solutions shown in FIGS. 18A and 18B, the current emission luminance of the backlight source 6 may be compared with the preset target luminance range, when the current emission luminance of the backlight source 6 is outside the preset target luminance range, a preset adjustment algorithm may be adopted to increase or decrease the duty ratio of the emission luminance control signal, then the backlight source 6 is controlled to emit light according to the adjusted duty ratio, and then the current emission luminance of the backlight source is continued to be acquired, and so on. If the adjusted duty ratio is outside the second preset duty ratio range, it indicates that the emission of the backlight source 6 is abnormal.

In some embodiments, the photosensor circuit is disposed on the back plate of the display module. The second signal processing subunit is integrated in a display control system chip of the display control system component 2. Specifically, the second signal processing subunit is integrated, as software, in the display control system chip of the display control system component 2.

Based on the foregoing, it can be seen that, through the fifth detection unit 115, whether a fault occurs in the emission of the backlight source 6 can be effectively detected, and the ninth operation state information for representing that the emission of the backlight source 6 is normal, or the tenth operation state information for representing that the emission of the backlight source 6 is abnormal can be output, facilitating the operation and maintenance personnel to operate and maintain the display product according to the received "operation state information", and improving the operation and maintenance efficiency.

Figure 19:
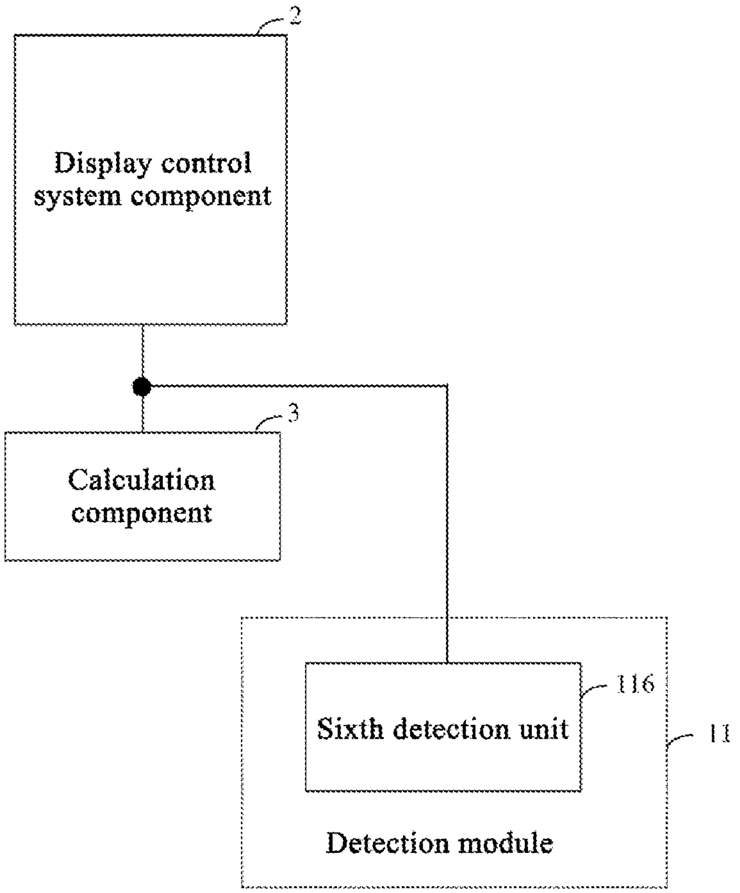
FIG. 19 is a block diagram illustrating still another structure of the detection module in an embodiment of the present disclosure.

FIG. 19 is a block diagram illustrating still another structure of the detection module in an embodiment of the present disclosure. As shown in FIG. 19, in some embodiments, the at least one target part includes the calculation component 3. The operation characteristic information of the calculation component 3 includes a horizontal synchronization signal and a vertical synchronization signal in a process of transmitting a display data signal by the calculation component 3 to the display control system component 2. The detection module 11 includes a sixth detection unit 116.

The sixth detection unit 116 is configured to output, in response to control of a sixth detection signal and according to the horizontal synchronization signal and/or the vertical synchronization signal, eleventh operation state information for indicating that a process of providing the display data signal by the calculation component 3 to the display control system component 2 is normal, or twelfth operation state information for indicating that the process of providing the display data signal by the calculation component 3 to the display control system component 2 is abnormal.

Figure 20A:
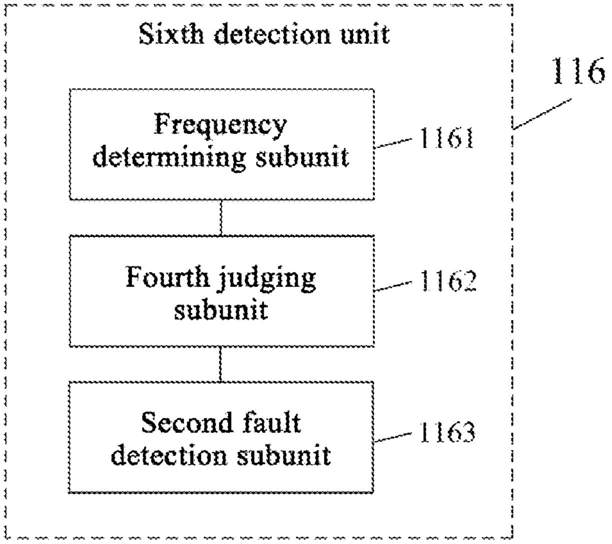
FIG. 20A is a block diagram illustrating a structure of a sixth detection unit in an embodiment of the present disclosure.
Figure 20B:
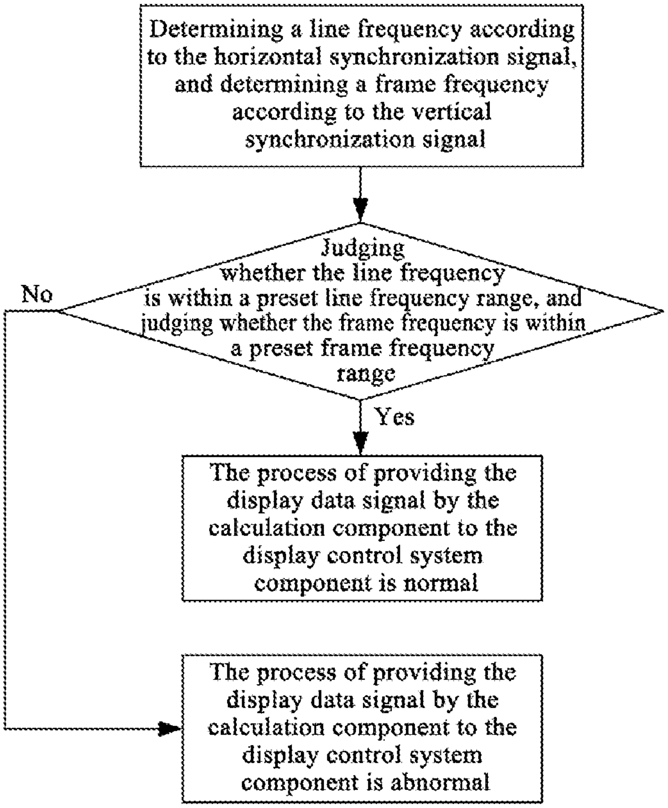
FIG. 20B is a flowchart illustrating processing logic for operation of the sixth detection unit shown in FIG. 20A.

FIG. 20A is a block diagram illustrating a structure of a sixth detection unit in an embodiment of the present disclosure. FIG. 20B is a flowchart illustrating processing logic for operation of the sixth detection unit shown in FIG. 20A. As shown in FIGS. 20A and 20B, in some embodiments, the sixth detection unit 116 includes a frequency determining subunit 1161, a fourth judging subunit 1162, and a second fault detection subunit 1163.

The frequency determining subunit 1161 is configured to determine, according to the horizontal synchronization signal, a line frequency at which the calculation component 3 transmits the display data signal, and determine, according to the vertical synchronization signal, a frame frequency at which the calculation component 3 transmits the display data signal.

The fourth judging subunit 1162 judges whether the line frequency determined by the frequency determining subunit 1161 is within a preset line frequency range, and whether the frame frequency determined by the frequency determining subunit 1161 is within a preset frame frequency range.

The second fault detection subunit 1163 is configured to detect that the process of providing the display data signal by the calculation component 3 to the display control system component 2 is normal, when the fourth judging subunit 1162 judges that the line frequency determined by the frequency determining subunit 1161 is within the preset line frequency range and the frame frequency determined by the frequency determining subunit is within the preset frame frequency range; and to detect that the process of providing the display data signal by the calculation component 3 to the display control system component 2 is abnormal, when the fourth judging subunit 1162 judges that the line frequency determined by the frequency determining subunit 1161 is outside the preset line frequency range and/or the fourth judging subunit 1162 judges that the frame frequency determined by the frequency determining subunit is outside the preset frame frequency range.

In the solutions shown in FIGS. 20A and 20B, the line frequency and the frame frequency of the display data signal transmitted by the calculation component 3 may be obtained according to an occurrence frequency of the horizontal synchronization signal and an occurrence frequency of the vertical synchronization signal in the process of transmitting the display data signal by the calculation component 3 to the display control system component 2. If the obtained line frequency is within the preset line frequency range and the obtained frame frequency is also within the preset frame frequency range, it indicates that the process of providing the display data signal by the calculation component 3 to the display control system component 2 is normal. If the obtained line frequency is outside the preset line frequency range and/or the obtained frame frequency is outside the preset frame frequency range, it indicates that the process of providing the display data signal by the calculation component 3 to the display control system component 2 is abnormal.

In some embodiments, the sixth detection unit 116 is integrated in the display control system component 2. Specifically, the sixth detection unit 116 is integrated, as software, in a display control system chip of the display control system component 2.

Based on the foregoing, it can be seen that, through the sixth detection unit 116, whether a fault occurs in the process of providing the display data signal by the calculation component 3 to the display control system component 2 can be effectively detected, and the eleventh operation state information for representing that the process of providing the display data signal by the calculation component 3 to the display control system component 2 is normal, or the twelfth operation state information for representing that the process of providing the display data signal by the calculation component 3 to the display control system component 2 is abnormal can be output, facilitating the operation and maintenance personnel to operate and maintain the display product according to the received "operation state information", and improving the operation and maintenance efficiency.

Figure 21:
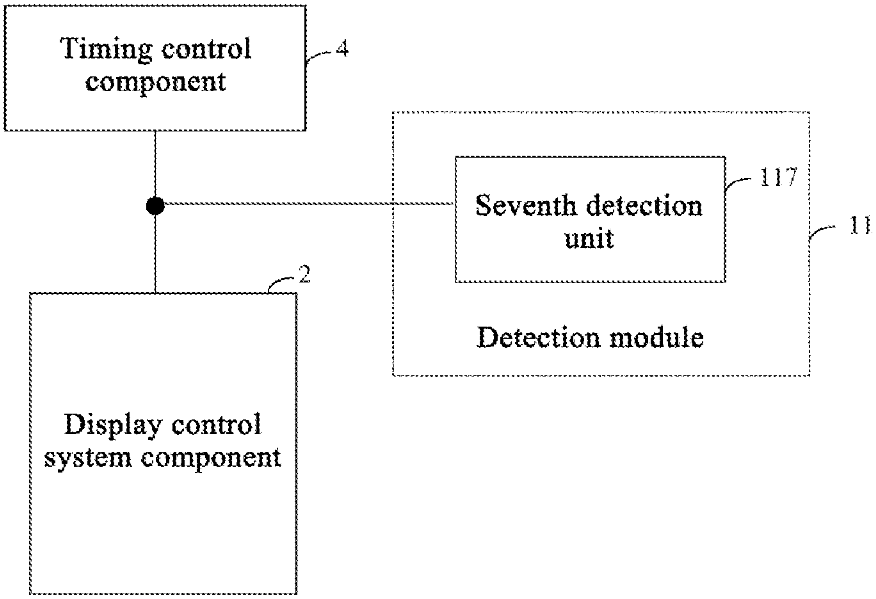
FIG. 21 is a block diagram illustrating still another structure of the detection module in an embodiment of the present disclosure.

FIG. 21 is a block diagram illustrating still another structure of the detection module 11 in an embodiment of the present disclosure. As shown in FIG. 21, the at least one target part includes the display control system component 2. The operation characteristic information of the display control system component 2 during operation thereof includes a handshake signal transmitted by the display control system component 2 to the calculation component 3. The detection module 11 includes a seventh detection unit 117.

The seventh detection unit 117 is configured to output, in response to control of a seventh detection signal and according to a condition of the handshake signal received by the timing control component 4 in a detection period, thirteenth operation state information for indicating that outputting a signal by the display control system component 2 to the timing control component 4 is normal, or fourteenth operation state information for indicating that the outputting a signal by the display control system component 2 to the timing control component 4 is abnormal.

A "handshake" procedure may be performed according to a communication protocol in a process of outputting a signal by the display control system component 2 to the timing control component 4. In the "handshake" procedure, handshake information is transferred. The process of outputting a signal by the display control system component 2 to the timing control component 4 can be determined to be normal or abnormal according to a condition of the handshake signal received by the timing control component 4 in the detection period.

In some embodiments, the display control system component 2 and the timing control component 4 communicate with each other through a high definition digital display (V-BY-ONE) interface. Optionally, the handshake signal includes a LOCKN signal. The LOCKN signal transmitted by the display control system component 2 to the timing control component 4 is a high level signal under a normal condition.

Figure 22A:
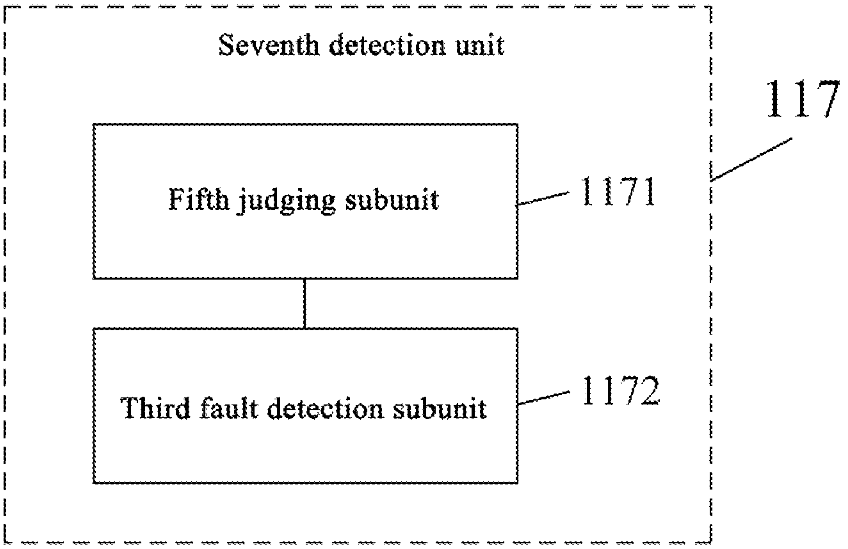
FIG. 22A is a block diagram illustrating a structure of a seventh detection unit in an embodiment of the present disclosure.
Figure 22B:
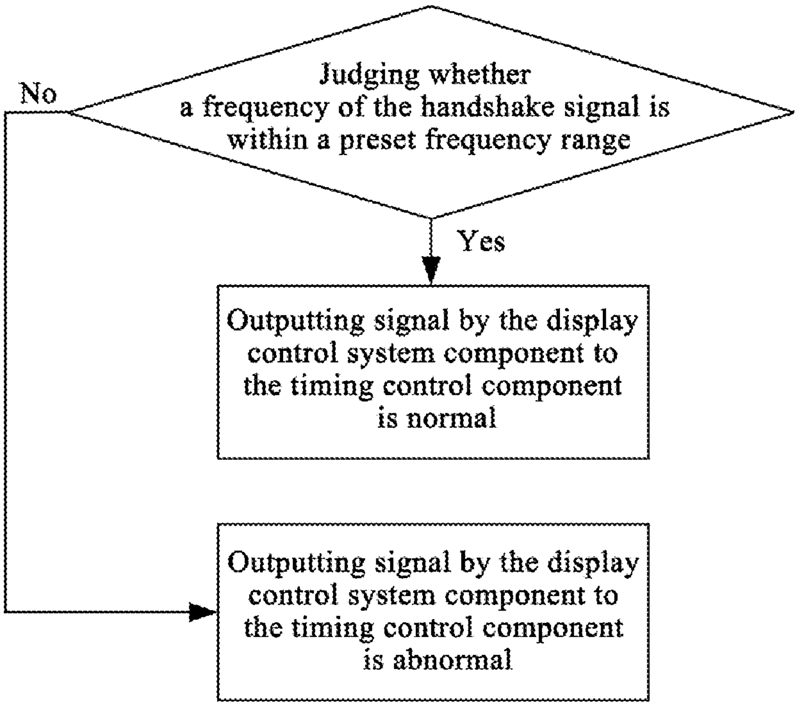
FIG. 22B is a flowchart illustrating processing logic for operation of the seventh detection unit shown in FIG. 22A.

FIG. 22A is a block diagram illustrating a structure of a seventh detection unit 117 in an embodiment of the present disclosure. FIG. 22B is a flowchart illustrating processing logic for operation of the seventh detection unit 117 shown in FIG. 22A. As shown in FIGS. 22A and 22B, in some embodiments, the seventh detection unit 117 includes a fifth judging subunit 1171 and a third fault detection subunit 1172.

The fifth judging subunit 1171 is configured to judge whether a frequency of receiving the handshake signal by the timing control component 4 in the detection period is within a preset frequency range.

The third fault detection subunit 1172 is configured to detect that the outputting a signal by the display control system component 2 to the timing control component 4 is normal when the fifth judging subunit 1171 judges that the frequency of receiving the handshake signal by the timing control component 4 in the detection period is within the preset frequency range; and detect that the outputting a signal by the display control system component 2 to the timing control component 4 is abnormal when the fifth judging subunit 1171 judges that the frequency of receiving the handshake signal by the timing control component 4 in the detection period is outside the preset frequency range.

In some embodiments, the seventh detection unit 117 is integrated in the timing control component 4. Specifically, the timing control component 4 includes a circuit board fixed with a timing control chip, and the seventh detection unit 117 is integrated, as software, in the timing control chip of the timing control component 4. An output terminal of the seventh detection unit 117 is electrically connected to the display control system component 2, to transmit the thirteenth operation state information or the fourteenth operation state information generated by the seventh detection unit 117 to the display control system component 2.

Based on the foregoing, it can be seen that, through the seventh detection unit 117, whether a fault occurs in the process of outputting a signal by the display control system component 2 to the timing control component 4 can be effectively detected, and the thirteenth operation state information for representing that the outputting a signal by the display control system component 2 to the timing control component 4 is normal, or the fourteenth operation state information for representing that the outputting a signal by the display control system component 2 to the timing control component 4 is abnormal can be output, facilitating the operation and maintenance personnel to operate and maintain the display product according to the received "operation state information", and improving the operation and maintenance efficiency.

Figure 23:
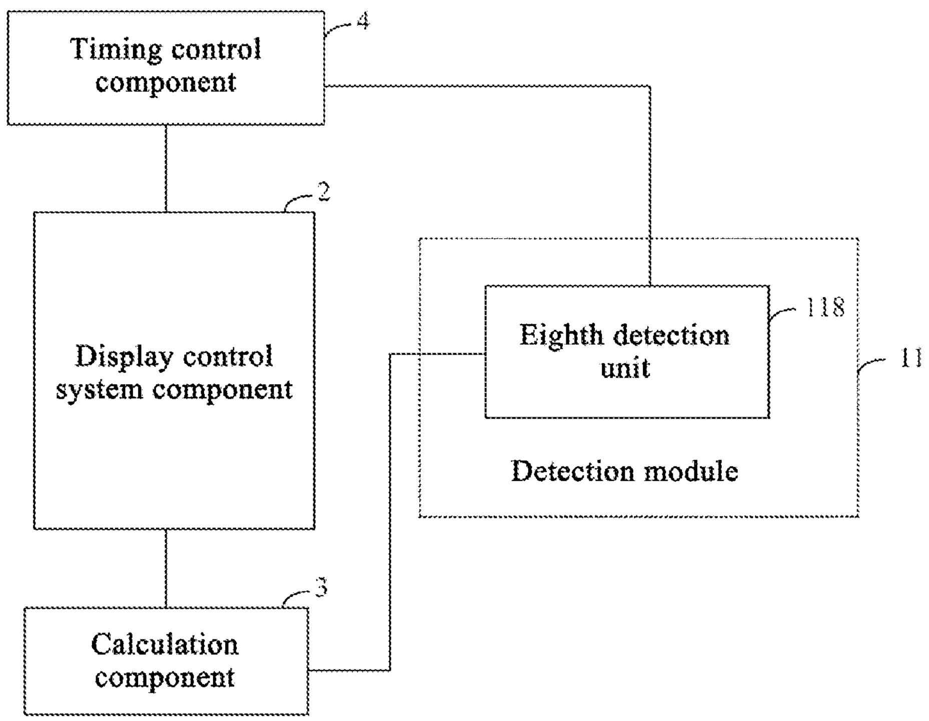
FIG. 23 is a block diagram illustrating still another structure of the detection module in an embodiment of the present disclosure.

FIG. 23 is a block diagram illustrating still another structure of the detection module 11 in an embodiment of the present disclosure. As shown in FIG. 23, in some embodiments, the at least one target part includes the display control system component 2. The operation characteristic information of the display control system component 2 during operation thereof includes a display data signal of an image to be displayed, acquired by the timing control component 4 from the display control system component 2. The detection module 11 includes an eighth detection unit 118.

In some embodiments, the eighth detection unit 118 is configured to output, in response to control of an eighth detection signal and according to a display data signal of an image to be displayed before a screen switching and a display data signal of an image to be displayed after the screen switching, acquired by the timing control component 4 from the display control system component 2, fifteenth operation state information for indicating that performing the screen switching by the display control system component 2 is normal, or sixteenth operation state information for indicating that performing the screen switching by the display control system component 2 is abnormal.

Figure 24A:
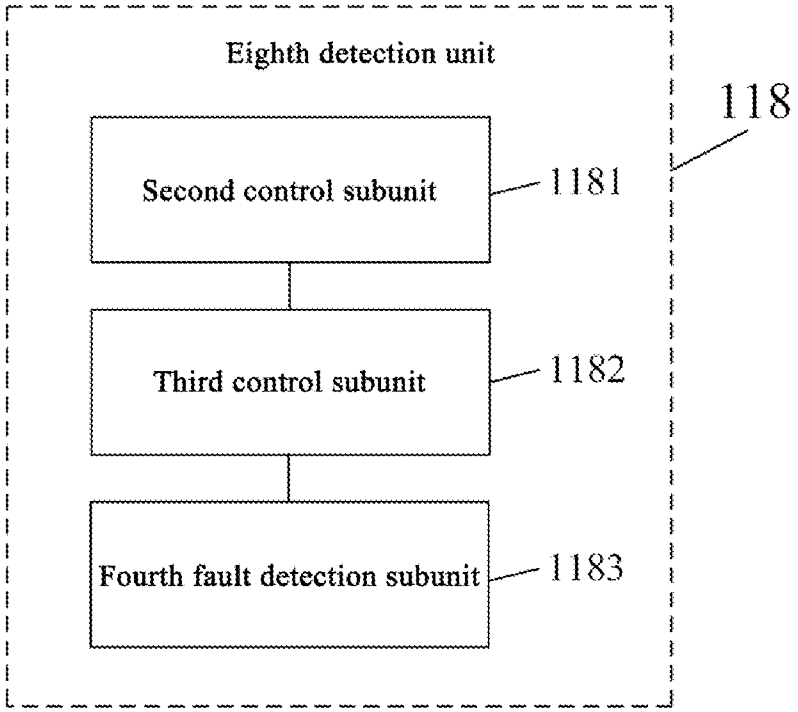
FIG. 24A is a block diagram illustrating a structure of an eighth detection unit in an embodiment of the present disclosure.
Figure 24B:
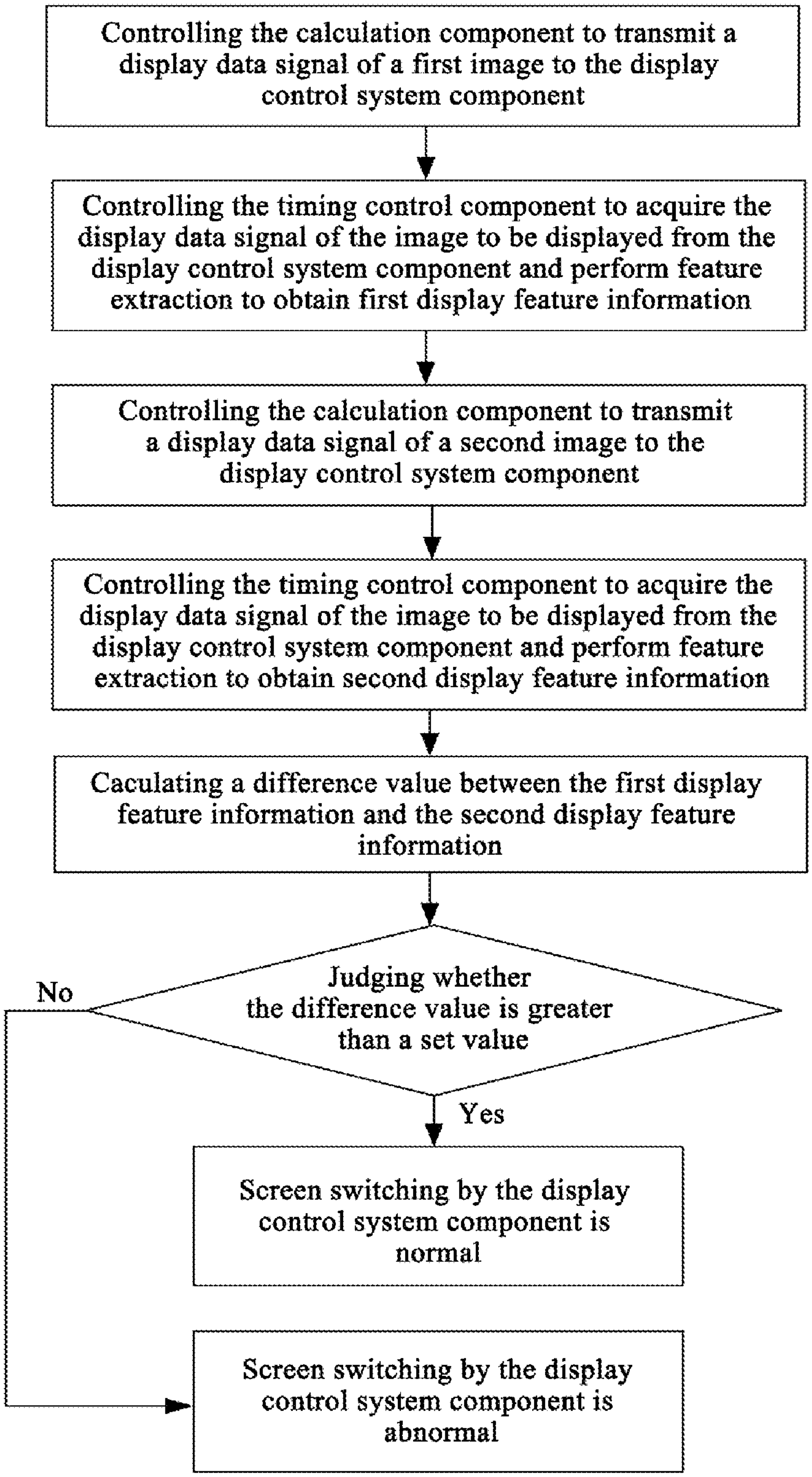
FIG. 24B is a flowchart illustrating processing logic for operation of the eighth detection unit shown in FIG. 24A.

FIG. 24A is a block diagram illustrating a structure of an eighth detection unit 118 in an embodiment of the present disclosure. FIG. 24B is a flowchart illustrating processing logic for operation of the eighth detection unit 118 shown in FIG. 24A. As shown in FIGS. 24A and 24B, in some embodiments, the eighth detection unit 118 includes a second control subunit 1181, a third control subunit 1182, and a fourth fault detection subunit 1183.

The second control subunit 1181 is configured to control the calculation component 3 to transmit a display data signal of a first image to the display control system component 2, and control the timing control component 4 to acquire the display data signal of the image to be displayed from the display control system component 2 and perform feature extraction on the acquired display data signal (extract at least one feature from this acquired display data signal) to obtain first display feature information.

The third control subunit 1182 is configured to control the calculation component 3 to transmit a display data signal of a second image to the display control system component 2, and control the timing control component 4 to acquire the display data signal of the image to be displayed from the display control system component 2 and perform feature extraction on the acquired display data signal (extract at least one feature from this acquired display data signal) to obtain second display feature information. The second image and the first image are two different images.

The fourth fault detection subunit 1183 is configured to detect, according to a difference between the first display feature information and the second display feature information, whether performing the screen switching by the display control system component 2 is normal or abnormal.

In the embodiment of the present disclosure, firstly, the calculation component 3 is controlled to transmit the display data signal of the first image to the display control system component 2, and the timing control component 4 is controlled to acquire the display data signal of the image to be displayed from the display control system component 2 and perform feature extraction to obtain the first display feature information. Then, the calculation component 3 is controlled to transmit the display data signal of the second image to the display control system component 2, so that the display control system component 2 performs screen switching, and the timing control component 4 is controlled to acquire the display data signal of the image to be displayed from the display control system component 2 and perform feature extraction to obtain the second display feature information. Then, whether performing the screen switching by the display control system component 2 is normal or abnormal is judged according to the difference between the first display feature information and the second display feature information. If the difference between the first display feature information and the second display feature information is greater than a set value, it indicates that the performing the screen switching by the display control system component 2 is normal. If the difference between the first display feature information and the second display feature information is less than or equal to the set value, it indicates that the performing the screen switching by the display control system component 2 is abnormal.

In some embodiments, the timing control component 4 is configured to, in response to control of the second control subunit 1181 or the third control subunit 1182, perform luminance feature extraction on the acquired display data signal (extract luminance feature from the acquired display data signal). The first display feature information includes first luminance information, and the second display feature information includes second luminance information. The fourth fault detection subunit is specifically configured to detect, according to a difference value between the first luminance information and the second luminance information, whether performing the screen switching by the display control system component 2 is normal or abnormal. When the difference value is greater than a preset target difference value, it is detected that the performing the screen switching by the display control system component 2 is normal. When the difference value is less than or equal to the preset target difference value, it is detected that the performing the screen switching by the display control system component 2 is abnormal.

In some embodiments, the first luminance information includes a first luminance function value, and the second luminance information includes a second luminance function value. The difference value between the first luminance information and the second luminance information is a quotient of an absolute value of a difference between the second luminance function value and the first luminance function value and a sum of the second luminance function value and the first luminance function value.

A luminance function may also be called a gray scale function, including for example a histogram function. According to an example of the present disclosure, a histogram function value may be extracted from an entire image frame. Alternatively, a partial image region may be determined from the entire image frame, and the histogram function value may be extracted from this partial image region. In addition, the number, areas, and coordinate values of the image regions for extracting the histogram function values may be set in advance, and then the histogram function values may be extracted based on the parameters set in advance.

Apparently, the luminance information obtained based on the luminance feature extraction in the embodiment of the present disclosure refers to luminance feature capable of describing an entire luminance feature of the screen, or luminance feature of one or more regions divided from the screen in advance. The luminance feature may specifically include a maximum value, a minimum value, an average value, a variance, a variation curve, or the like of the luminance (or the gray scale) in the corresponding region. The case of adopting the histogram function to perform luminance feature extraction described above is only an optional implementation in an embodiment of the present disclosure, and does not limit the technical solution of the present disclosure. In an embodiment of the present disclosure, other feature extraction algorithms may alternatively be adopted to perform luminance feature extraction on the display data signal, as long as a same feature extraction algorithm is adopted for both feature extractions.

In some embodiments, the eighth detection unit 118 is integrated in the display control system component 2. Further optionally, the eighth detection unit 118 is integrated, as software, in a display control system chip of the display control system component 2.

Based on the foregoing, it can be seen that, through the eighth detection unit 118, whether a fault occurs in performing the screen switching by the display control system component 2 can be effectively detected, and the fifteenth operation state information for indicating that the performing the screen switching by the display control system component 2 is normal, or the sixteenth operation state information for indicating that the performing the screen switching by the display control system component 2 is abnormal can be output, facilitating the operation and maintenance personnel to operate and maintain the display product according to the received "operation state information", and improving the operation and maintenance efficiency.

It should be noted that, in practical applications, the detection module 11 may selectively include at least one of the first detection unit 111, the second detection unit 112, the third detection unit 113, the fourth detection unit 114, the fifth detection unit 115, the sixth detection unit 116, the seventh detection unit 117, and the eighth detection unit 118 in the above embodiments according to actual needs, so that at least one of the power component 1, the display control system component 2, the calculation component 3, the timing control component 4, the backlight driving component 5, and the backlight source 6 is monitored. A new technical solution obtained by combining the above technical means also belongs to the protection scope of the present disclosure.

Based on the foregoing, it can be seen that, the "operation state information" outputted by the first detection unit 111 to the eighth detection unit 118 may be transmitted to the display control system component 2. Therefore, as an optional implementation, for various faults, a fault flag and meanings of different values taken by the fault flag may be designed in advance. In an actual operating process, the display control system component 2 may determine a current value of the fault flag according to the received various operation state information.

As one example, the first detection unit 111 may be designed with a fault flag "PG" for indicating whether the supplying power by the power component 1 to the display control system component 2 is normal or abnormal. "PG" has two values, "1" or "0", where a value of "1" indicates that the supplying power by the power component 1 to the display control system component 2 is normal, and a value of "0" indicates that the supplying power by the power component 1 to the display control system component 2 is abnormal.

The second detection unit 112 may be designed with a fault flag "TPG" for indicating whether the supplying power by the display control system component 2 to the timing control component 4 is normal or abnormal. "TPG" has two values, "1" or "0", where a value of "1" indicates that the supplying power by the display control system component 2 to the timing control component 4 is normal, and a value of "0" indicates that the supplying power by the display control system component 2 to the timing control component 4 is abnormal.

The third detection unit 113 may be designed with a fault flag "LDV" for indicating whether the supplying power by the backlight driving component 5 to the backlight source 6 is normal or abnormal. "LDV" has two values, "1" or "0", where a value of "1" indicates that the supplying power by the backlight driving component 5 to the backlight source 6 is normal, and a value of "0" indicates that the supplying power by the backlight driving component 5 to the backlight source 6 is abnormal.

The fourth detection unit 114 may be designed with a fault flag "LDI" for indicating whether the operating current of the backlight source 6 is normal or abnormal. "LDI" has two values, "1" or "0", where a value of "1" indicates that the operating current of the backlight source 6 is normal, and a value of "0" indicates that the operating current of the backlight source 6 is abnormal.

The fifth detection unit 115 may be designed with a fault flag "BRI" for indicating whether the emission of the backlight source 6 is normal or abnormal. "BRI" has two values, "1" or "0", where a value of "1" indicates that the emission of the backlight source 6 is normal, and a value of "0" indicates that the emission of the backlight source 6 is abnormal.

The sixth detection unit 116 may be designed with a fault flag "CP" for indicating whether the process of providing the display data signal by the calculation component 3 to the display control system component 2 is normal or abnormal. "CP" has two values, "1" or "0", where a value of "1" indicates that the process of providing the display data signal by the calculation component 3 to the display control system component 2 is normal, and a value of "0" indicates that the process of providing the display data signal by the calculation component 3 to the display control system component 2 is abnormal.

The seventh detection unit 117 may be designed with a fault flag "LK" for indicating whether the process of outputting a signal by the display control system component 2 to the timing control component 4 is normal or abnormal. "LK" has two values, "1" or "0", where a value of "1" indicates that the process of outputting a signal by the display control system component 2 to the timing control component 4 is normal, and a value of "0" indicates that the process of outputting a signal by the display control system component 2 to the timing control component 4 is abnormal.

The eighth detection unit 118 may be designed with a fault flag "PCLK" for indicating whether performing the screen switching by the display control system component 2 is normal or abnormal. "PCLK" has two values, "1" or "0", where a value of "1" indicates that the performing the screen switching by the display control system component 2 is normal, and a value of "0" indicates that the performing the screen switching by the display control system component 2 is abnormal.

Based on the above setting, in an actual operating process, if the display control system component 2 receives the first operation state information output by the first detection unit 111, the display control system component 2 assigns "1" to the fault flag "PG"; and if the display control system component 2 receives the second operation state information output by the first detection unit 111, the display control system component 2 assigns "0" to the fault flag "PG".

If the display control system component 2 receives the third operation state information output by the second detection unit 112, the display control system component 2 assigns "1" to the fault flag "TPG"; and if the display control system component 2 receives the fourth operation state information output by the second detection unit 112, the display control system component 2 assigns "0" to the fault flag "TPG".

If the display control system component 2 receives the fifth operation state information output by the third detection unit 113, the display control system component 2 assigns "1" to the fault flag "LDV"; and if the display control system component 2 receives the sixth operation state information output by the third detection unit 113, the display control system component 2 assigns "0" to the fault flag "LDV".

If the display control system component 2 receives the seventh operation state information output by the fourth detection unit 114, the display control system component 2 assigns "1" to the fault flag "LDI"; and if the display control system component 2 receives the eighth operation state information output by the fourth detection unit 114, the display control system component 2 assigns "0" to the fault flag "LDI".

If the display control system component 2 receives the ninth operation state information output by the fifth detection unit 115, the display control system component 2 assigns "1" to the fault flag "BRI"; and if the display control system component 2 receives the tenth operation state information output by the fifth detection unit 115, the display control system component 2 assigns "0" to the fault flag "BRI".

If the display control system component 2 receives the eleventh operation state information output by the sixth detection unit 116, the display control system component 2 assigns "1" to the fault flag "CP"; and if the display control system component 2 receives the twelfth operation state information output by the sixth detection unit 116, the display control system component 2 assigns "0" to the fault flag "CP".

If the display control system component 2 receives the thirteenth operation state information output by the seventh detection unit 117, the display control system component 2 assigns "1" to the fault flag "LK"; and if the display control system component 2 receives the fourteenth operation state information output by the seventh detection unit 117, the display control system component 2 assigns "0" to the fault flag "LK".

If the display control system component 2 receives the fifteenth operation state information output by the eighth detection unit 118, the display control system component 2 assigns "1" to the fault flag "PCLK"; and if the display control system component 2 receives the sixteenth operation state information output by the eighth detection unit 118, the display control system component 2 assigns "0" to the fault flag "PCLK".

In some embodiments, any at least two of the power component 1, the display control system component 2, the calculation component 3, the timing control component 4, and the backlight driving component 5 are located on a same circuit board.

In some embodiments, the power component 1, the display control system component 2, the calculation component 3, the timing control component 4 and the backlight driving component 5 are integrated on a same circuit board, which can increase the integration of the display module and reduce the cost.

In some embodiments, the transmission module 12 is integrated in the calculation component 3. The transmission module 12 may be a wired communication module or a wireless communication module (e.g., a WIFI communication module, a 4G communication module, a 5G communication module, or the like).

The display control system component 2 may transmit the operation state information (specifically, the fault flag and its corresponding assignment) to the calculation component 3 through an existing IC2 interface or an extended data interface (for example, an AUX interface), and the transmission module 12 in the calculation component 3 may transmit the received operation state information to the target object.

Based on the monitoring system in the display module, the display module can have the fault self-diagnosis function, and the operation state information of the target part in the display module can be transmitted to the operation and maintenance personnel for reference, so that the operation and maintenance personnel are not required to inspect on-site on whether a fault occurs in the display product, which is convenient for the operation and maintenance personnel to perform operation and maintenance on the display product, and favorable to promoting the operation and maintenance efficiency.

Based on the same inventive concept, an embodiment of the present disclosure further provides a display device, which includes the display module provided in the foregoing embodiments. For specific description of the display module, reference may be made to corresponding contents in the foregoing embodiments.

In an embodiment of the present disclosure, the display device may include one or more display modules. As one example, the display device is a splicing screen, and the plurality of display modules may be combined into the splicing screen according to a predetermined sequence (e.g., spliced in an array).

The display device in an embodiment of the present disclosure may be specifically a display product or part with a display function, such as an electronic tag, a tablet computer, a notebook computer, a palm computer, a vehicle-mounted electronic apparatus, a Mobile Internet Device (MID), an Augmented Reality (AR)/Virtual Reality (VR) apparatus, a robot, a wearable apparatus, an Ultra Mobile Personal Computer (UMPC), a netbook, a Personal Digital Assistant (PDA), a Personal Computer (PC), a television (TV), a teller machine, or a self-service machine.

Figure 25:
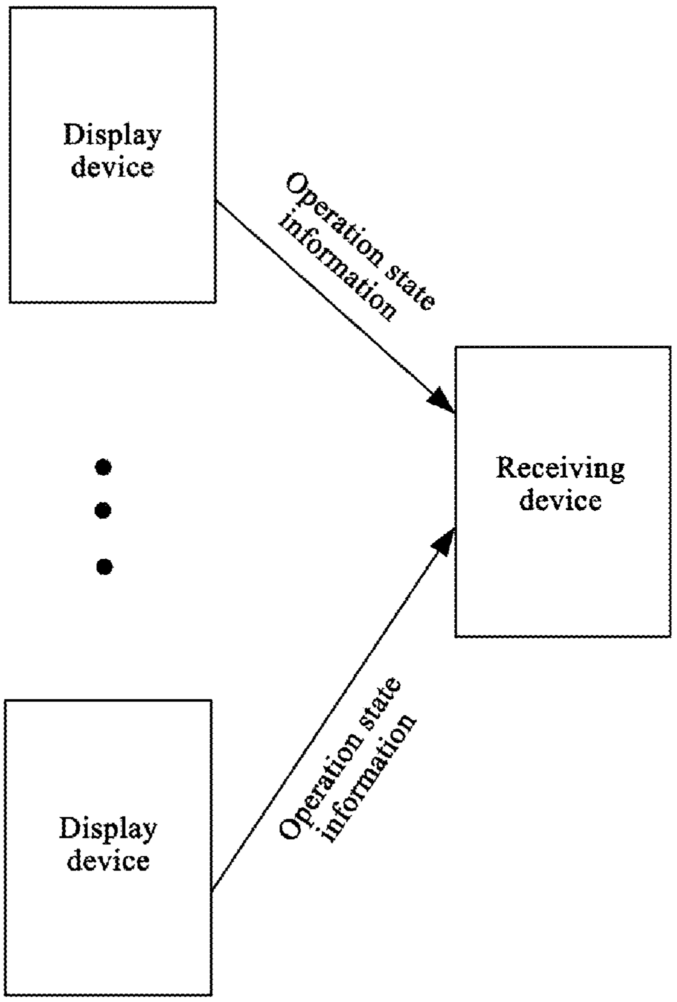
FIG. 25 is a block diagram illustrating a structure of a display system in an embodiment of the present disclosure.

FIG. 25 is a block diagram illustrating a structure of a display system in an embodiment of the present disclosure. As shown in FIG. 25, according to the same inventive concept, an embodiment of the present disclosure further provides a display system, which includes the display device provided in the foregoing embodiment and a receiving device (that is, the aforementioned target object). The specific description of the display device may refer to the corresponding contents in the foregoing embodiment. The receiving device is configured to receive the operation state information transmitted by the transmission module.

In an embodiment of the present disclosure, the receiving device may be a server or a specific terminal (e.g., an electronic apparatus such as a mobile phone, a tablet, or a computer, which is available for the operation and maintenance personnel to refer to the information).

In some embodiments, the display device screens all the operation state information before transmitting the operation state information, and the display device finally transmits only operation state information for representing that an operation of a target part is abnormal. In this case, the receiving device may receive and display only the operation state information for representing that the operation of the target part is abnormal.

In some embodiments, the display device transmits all the operation state information (including the operation state information for indicating that the operation of the target part is normal and the operation state information for indicating that the operation of the target part is abnormal) generated by the detection module, and the receiving device may receive all the operation state information accordingly. However, the receiving device may selectively display part or all of the operation state information. For example, only the operation state information for representing that the operation of the target part is abnormal is displayed, or only the operation state information for representing that the operation of the target part is normal is displayed, or all the operation state information is indiscriminately displayed, or only the operation state information corresponding to a certain specific target part is displayed while the operation state information corresponding to other target parts is not displayed.

One or more display devices and one or more receiving devices may be included in the embodiment of the present disclosure. Each display device may transmit the generated operation state information to one or more receiving devices, and each receiving device may receive the operation state information transmitted from one or more display devices.

As some examples of the display device in the display system in an embodiment of the present disclosure, the display device may specifically be a display for presenting an advertisement, an electronic tag for displaying commodity information, a self-service machine for a user to query commodity information/store information/navigation lines, a navigation/stop board for displaying traffic information, or a display screen disposed in an electrical appliance (for example, a refrigerator, a washing machine, a purifier, a vending machine, or the like) for displaying relevant information of the electrical appliance.

It will be understood by one of ordinary skill in the art that all or part of the functional modules, units, subunits in the systems disclosed above may be implemented as software, firmware, hardware, or a suitable combination thereof. In a hardware implementation, the division between functional modules mentioned in the above description does not necessarily correspond to a division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or implemented as hardware, or implemented as an integrated circuit, such as an application specific integrated circuit. Such software may be distributed on a computer readable medium, which may include a computer storage medium (also referred as non-transitory medium) and a communication medium (also referred as a transitory medium). As is well known to one of ordinary skill in the art, the term "computer storage medium" includes volatile and nonvolatile, removable and non-removable media implemented in any method or technology for storage of information such as computer readable instructions, data structures, program modules or other data. The computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and can be accessed by a computer. In addition, as is well known to one of ordinary skill in the art, the communication medium typically includes computer readable instructions, data structures, program modules or other data in a modulated data signal such as a carrier wave or other transport mechanism, and may include any information delivery medium.

Exemplary embodiments have been disclosed herein, and although specific terms are employed, they are used and should be interpreted in a generic and descriptive sense only and not for purposes of limitation. In some instances, it is obvious to one of ordinary skill in the art that, unless expressly stated otherwise, a feature, a characteristic and/or an element described in connection with a particular embodiment may be used alone or in combination with a feature, a characteristic and/or an element described in connection with other embodiments. Therefore, it will be understood by one of ordinary skill in the art that various changes in form and details may be made without departing from the scope of the present disclosure as set forth in the appended claims.

What is claimed is:

1. A display module, comprising a power component and a display control system component;

wherein the power component serves as a target part, and a control system voltage signal in each of at least one first power supply channel for supplying power by the power component to the display control system component serves as operation characteristic information of the power component during operation of the power component; and the display module further comprises a monitoring system, which comprises:

a first detection unit, which is connected to the at least one first power supply channel and configured to output, in response to control of a first detection signal and according to a condition of the control system voltage signal loaded in each of the first power supply channel, first operation state information for representing that supplying power by the power component to the display control system component is normal, or second operation state information for representing that the supplying power by the power component to the display control system component is abnormal; and a transmitter, which is configured to transmit the first operation state information or the second operation state information.

2. The display module of claim 1, wherein the at least one first power supply channel for supplying power by the power component to the display control system component comprises one first power supply channel;

the first detection unit comprises a first voltage detection circuit; and an input terminal of the first voltage detection circuit is electrically connected to the first power supply channel, and the first voltage detection circuit is configured to output first operation state information when the first power supply channel is loaded with the control system voltage signal, and output second operation state information when the first power supply channel is not loaded with the control system voltage signal, or wherein the at least one first power supply channel for supplying power by the power component to the display control system component comprises at least two first power supply channels;

the first detection unit comprises a logic processing circuit and at least two first voltage detection circuits in one-to-one correspondence with the at least two first power supply channels;

an input terminal of each of the first voltage detection circuits is electrically connected to a corresponding one of the first power supply channels, and an output terminal of the first voltage detection circuit is electrically connected to an input terminal of the logic processing circuit;

the first voltage detection circuit is configured to output a first level signal when the corresponding first power supply channel is loaded with the control system voltage signal, and output a second level signal when the corresponding first power supply channel is not loaded with the control system voltage signal;

the logic processing circuit is configured to output first operation state information when each of the first voltage detection circuits electrically connected to the logic processing circuit outputs the first level signal, and output second operation state information when at least one of the first voltage detection circuits electrically connected to the logic processing circuit outputs the second level signal; and one of the first level signal and the second level signal is a high level signal, and the other of the first level signal and the second level signal is a low level signal, wherein the first power supply channels for supplying power by the power component to the display control system component comprise a power supply channel for providing the display control system component with operating voltage required for the display control system component, and a power supply channel for providing the display control system component with the operating voltage required for a display panel.

3. The display module of claim 2, wherein the first voltage detection circuit comprises a first resistor, a second resistor, a third resistor and a first transistor;

a first terminal of the first resistor is electrically connected to the input terminal of the first voltage detection circuit, and a second terminal of the first resistor is electrically connected to a first terminal of the second resistor and a gate of the first transistor;

the first terminal of the second resistor is electrically connected to the gate of the first transistor, and a second terminal of the second resistor is electrically connected to a low level supply terminal;

a first electrode of the first transistor is electrically connected to an output terminal of the first voltage detection circuit, and a second electrode of the first transistor is electrically connected to the low level supply terminal; and a first terminal of the third resistor is electrically connected to a first high level supply terminal, and a second terminal of the third resistor is electrically connected to the output terminal of the first voltage detection circuit and the first electrode of the first transistor, wherein the display control system component comprises a standby power supply module, and the first high level supply terminal is an output terminal of the standby power supply module, and/or wherein the first power supply channel is provided with a safety circuit, a first terminal of the safety circuit is electrically connected to the power component, and a second terminal of the safety circuit is electrically connected to the display control system component; and the first detection unit is electrically connected to the second terminal of the safety circuit.

4. A display system, comprising a display device and a receiving device;

wherein the receiving device comprises the display module of claim 1 and is configured to receive the first operation state information or the second operation state information transmitted by the transmitter.

5. A display module, comprising a display control system component and a timing control component;

wherein the display control system component serves as a target part, and a timing controller voltage signal in a second power supply channel for supplying power by the display control system component to the timing control component serves as operation characteristic information of the display control system component during operation of the display control system component; and the display module further comprises a monitoring system, which comprises:

a second detection unit, which is connected to the second power supply channel and configured to output, in response to control of a second detection signal and according to a condition of the timing controller voltage signal loaded in the second power supply channel, third operation state information for representing that supplying power by the display control system component to the timing control component is normal, or fourth operation state information for representing that the supplying power by the display control system component to the timing control component is abnormal; and a transmitter, which is configured to transmit the third operation state information or the fourth operation state information.

6. The display module of claim 5, wherein the second detection unit comprises:

a second voltage detection circuit, wherein an input terminal of the second voltage detection circuit is electrically connected to the second power supply channel, and the second voltage detection circuit is configured to output the third operation state information when the second power supply channel is loaded with the timing controller voltage signal, and output the fourth operation state information when the second power supply channel is not loaded with the timing controller voltage signal;

the second voltage detection circuit comprises an eleventh resistor, a twelfth resistor, a thirteenth resistor, and an eleventh transistor;

a first terminal of the eleventh resistor is electrically connected to the input terminal of the second voltage detection circuit, and a second terminal of the eleventh resistor is electrically connected to a first terminal of the twelfth resistor and a gate of the eleventh transistor;

the first terminal of the twelfth resistor is electrically connected to the gate of the eleventh transistor, and a second terminal of the twelfth resistor is electrically connected to a low level supply terminal;

a first electrode of the eleventh transistor is electrically connected to an output terminal of the second voltage detection circuit, and a second electrode of the eleventh transistor is electrically connected to the low level supply terminal; and a first terminal of the thirteenth resistor is electrically connected to a first high level supply terminal, and a second terminal of the thirteenth resistor is electrically connected to the output terminal of the second voltage detection circuit and the first electrode of the eleventh transistor, and/or wherein the second power supply channel is provided with a power supply transistor, a first electrode of the power supply transistor is electrically connected to the display control system component, and a second electrode of the power supply transistor is electrically connected to the timing control component; and the second detection unit is electrically connected to the second electrode of the power supply transistor.

7. A display system, comprising a display device and a receiving device;

wherein the receiving device comprises the display module of claim 5 and is configured to receive the third operation state information or the fourth operation state information transmitted by the transmitter.

8. A display module, wherein the display module comprises a backlight driving component;

the backlight driving component serves as a target part, a power supply output terminal of the backlight driving component is electrically connected to a first terminal of a backlight source, and the backlight driving component is provided with an 12C data reading interface;

a backlight source voltage signal at a power supply output terminal for supplying power by the backlight driving component to the backlight source serves as operation characteristic information of the backlight driving component during operation of the backlight driving component; and the display module further comprises a monitoring system, which comprises:

a third detection unit, which is connected to the 12C data reading interface for the backlight driving component and configured to output, in response to control of a third detection signal and according to a voltage value of the backlight source voltage signal at the power supply output terminal, which is read by the 12C data reading interface for the backlight driving component, fifth operation state information for representing that supplying power by the backlight driving component to the backlight source is normal, or sixth operation state information for representing that the supplying power by the backlight driving component to the backlight source is abnormal; and a transmitter, which is configured to transmit the fifth operation state information or the sixth operation state information, or wherein the display module comprises a backlight driving component and a backlight source;

the backlight driving component serves as a target part, and a power supply output terminal of the backlight driving component is electrically connected to a first terminal of the backlight source;

a backlight source voltage signal at the power supply output terminal for supplying power by the backlight driving component to the backlight source serves as operation characteristic information of the backlight driving component during operation of the backlight driving component; and the display module further comprises a monitoring system, which comprises:

a third detection unit, which is electrically connected to the power supply output terminal and configured to output, in response to control of a third detection signal and according to a condition of the backlight source voltage signal loaded at the power supply output terminal, fifth operation state information for representing that supplying power by the backlight driving component to the backlight source is normal, or sixth operation state information for representing that the supplying power by the backlight driving component to the backlight source is abnormal; and a transmitter, which is configured to transmit the fifth operation state information or the sixth operation state information.

9. A display system, comprising a display device and a receiving device;

wherein the receiving device comprises the display module of claim 8 and is configured to receive the fifth operation state information or the sixth operation state information transmitted by the transmitter.

* * * * *